(12) United States Patent
Khalid

(10) Patent No.: US 11,082,937 B2
(45) Date of Patent: Aug. 3, 2021

(54) METHODS AND APPARATUS FOR DISTRIBUTING TIME, FREQUENCY, AND/OR PHASE INFORMATION USING NB-IOT

(71) Applicant: Charter Communications Operating, LLC, St. Louis, MO (US)

(72) Inventor: Saran Khalid, Denver, CO (US)

(73) Assignee: Charter Communications Operating, LLC, St. Louis, MO (US)

(*) Notice: Subject to any disclaimer, the term of this patent is extended or adjusted under 35 U.S.C. 154(b) by 37 days.

(21) Appl. No.: 16/663,066

(22) Filed: Oct. 24, 2019

(65) Prior Publication Data

US 2021/0127342 A1    Apr. 29, 2021

(51) Int. Cl.
*H04W 56/00*    (2009.01)
*H04W 4/70*    (2018.01)

(52) U.S. Cl.
CPC ........... *H04W 56/001* (2013.01); *H04W 4/70* (2018.02)

(58) Field of Classification Search
CPC ............................. H04W 56/001; H04W 4/70
See application file for complete search history.

(56) References Cited

U.S. PATENT DOCUMENTS

2020/0200864 A1* 6/2020 Wirola ..................... H04K 3/68

* cited by examiner

*Primary Examiner* — Diane D Mizrahi
(74) *Attorney, Agent, or Firm* — Straub & Straub; Michael P. Straub; Stephen T. Straub

(57) ABSTRACT

Timing synchronization information is communicated to a plurality of indoor communications devices supporting NB-IoT, e.g., indoor CBSDs supporting NB-IoT, from an outdoor communications device, e.g. a cellular base station supporting NB-IoT signaling using guard bands of a communications channel. An indoor device receiving the timing synchronization information from the outdoor device via NB-IoT signaling may, and sometimes does, process and forward synchronization information to other indoor devices, e.g. other CBSDs, which may be out of direct range of the outdoor device. In some embodiments, a plurality of outdoor base stations supporting NB-IoT receive timing reference information for distribution from the same NPT server coupled to a single reference source, e.g. an atomic clock.

20 Claims, 23 Drawing Sheets

TRADITIONAL APPROACH IN SYNCHRONIZATION OF IN-BUILDING TD LTE CBRS RADIOS

METHODS AND APPARATUS FOR DISTRIBUTING TIME, FREQUENCY, AND/OR PHASE INFORMATION USING NB-IOT

FIELD

The present application relates to communications methods and apparatus, and more particularly, to methods and apparatus for distributing timing synchronization information using NB-IoT in a communications system including indoor devices.

BACKGROUND

Citizens Broadband Radio Services (CBRS) Time Division (TD) Long Term Evolution (LTE) network devices need a clock source to synchronize frequency, phase and Time of Day (ToD). This can usually be achieved using a Global Navigation Satellite System (GNSS) or infrastructures employing Precision Time Protocol (PTP). However, a GNSS signal is typically not available inside buildings, and the approach of using PTP requires separate infrastructure which is costly.

Drawing 100 of FIG. 1 illustrates a traditional approach for synchronization used for indoor CBRS RD-LTE radios. FIG. 1 includes a GPS unit 104, including a GPS receive antenna and GPS receiver, which is coupled to a timing sync server 102, which is coupled to an Ethernet switch 106. Ethernet switch 106 is coupled to a Main Distribution Frame (MDF) 110 in building 108. Building 108 includes MDF 110, which is coupled to a plurality of Intermediate Distribution Frames (IDFs) (IDF 1 112 for floor 1, IDF 2 114 for floor 2, IDF 3 115 for floor 3, ..., IDF N 116 for floor N.) Each IDF is coupled to a plurality of Citizens Broadband radio Services Devices (CBSDs). IDF 1 112 is coupled to CBSDs (CBSD11 118, CBSD12 120, CBSD13 122, CBSD14 124, ..., CBSD1M 126), as shown in FIG. 1. IDF 2 114 is coupled to CBSDs (CBSD21 128, CBSD22 130, CBSD23 132, CBSD24 134, ..., CBSD2M 136), as shown in FIG. 1. IDF 3 115 is coupled to CBSDs (CBSD31 138, CBSD32 140, CBSD33 142, CBSD34 144, ..., CBSD3M 146), as shown in FIG. 1. IDF N 116 is coupled to CBSDs (CBSDN1 148, CBSDN2 150, CBSDN3 152, CBSDN4 154, ..., CBSDNM 156), as shown in FIG. 1. Synchronization information obtained from satellites, via GPS unit 104, is relayed to Citizen Broadband radio Services Devices (CBSDs) (118, 120, 122, 124, 126, 128, 130, 132, 134, 136, 138, 140, 142, 144, 146, 148, 150, 152, 154, 156) using the time sync server 102. This traditional approach uses a GPS receiver and a time sync server at each building site, which can be costly.

Based on the above discussion there is a need for new methods and apparatus for distributing synchronization information, e.g., time, phase and/or frequency information to indoor devices.

SUMMARY

An exemplary approach, in accordance with various embodiments of the present invention, uses Narrowband Internet of Things (NB-IoT) capable devices in a communications network to communicate timing synchronization information. In some embodiments, indoor CBSDs are synchronized by using NB-IoT technology over the air. In various embodiments, both outdoor and indoor Radio Access Network (RAN) devices support NB-IoT signaling.

An exemplary method of communicating timing information, in accordance with some embodiments, comprises: operating a first indoor device with a NB-IoT receiver to receive a NB-IoT signal transmitted by an first outdoor base station and to recover timing information from said received NB-IoT signal; and operating the first indoor device to communicate timing information recovered from said received NB-IoT signal to a second indoor device.

While various features discussed in the summary are used in some embodiments it should be appreciated that not all features are required or necessary for all embodiments and the mention of features in the summary should in no way be interpreted as implying that the feature is necessary or critical for all embodiments.

Numerous additional features and embodiments are discussed in the detailed description which follows.

DETAILED DESCRIPTION

Figure 1:
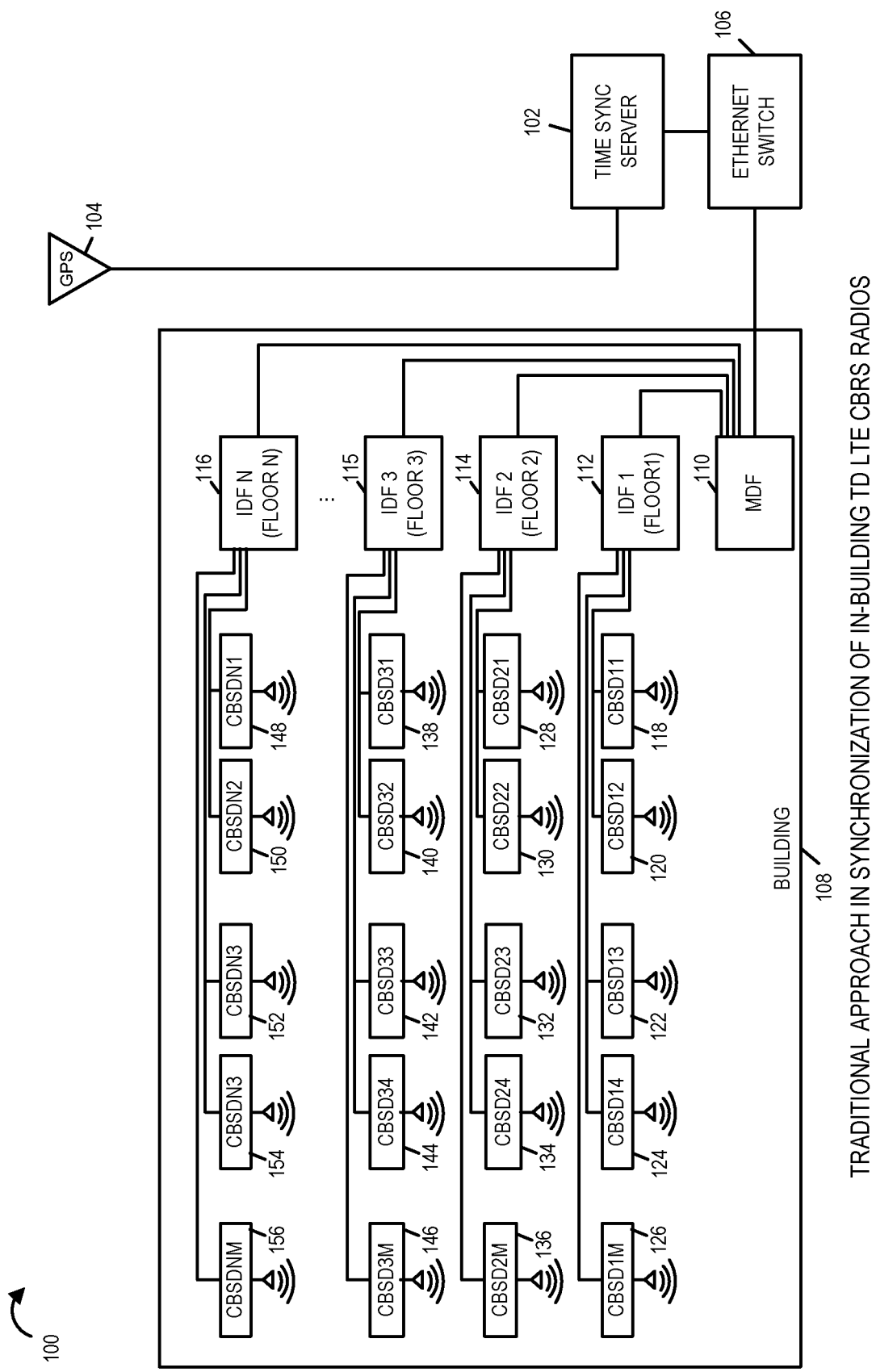
FIG. 1 illustrates a traditional approach for synchronization used for indoor CBRS TD-LTE radios.
Figure 2:
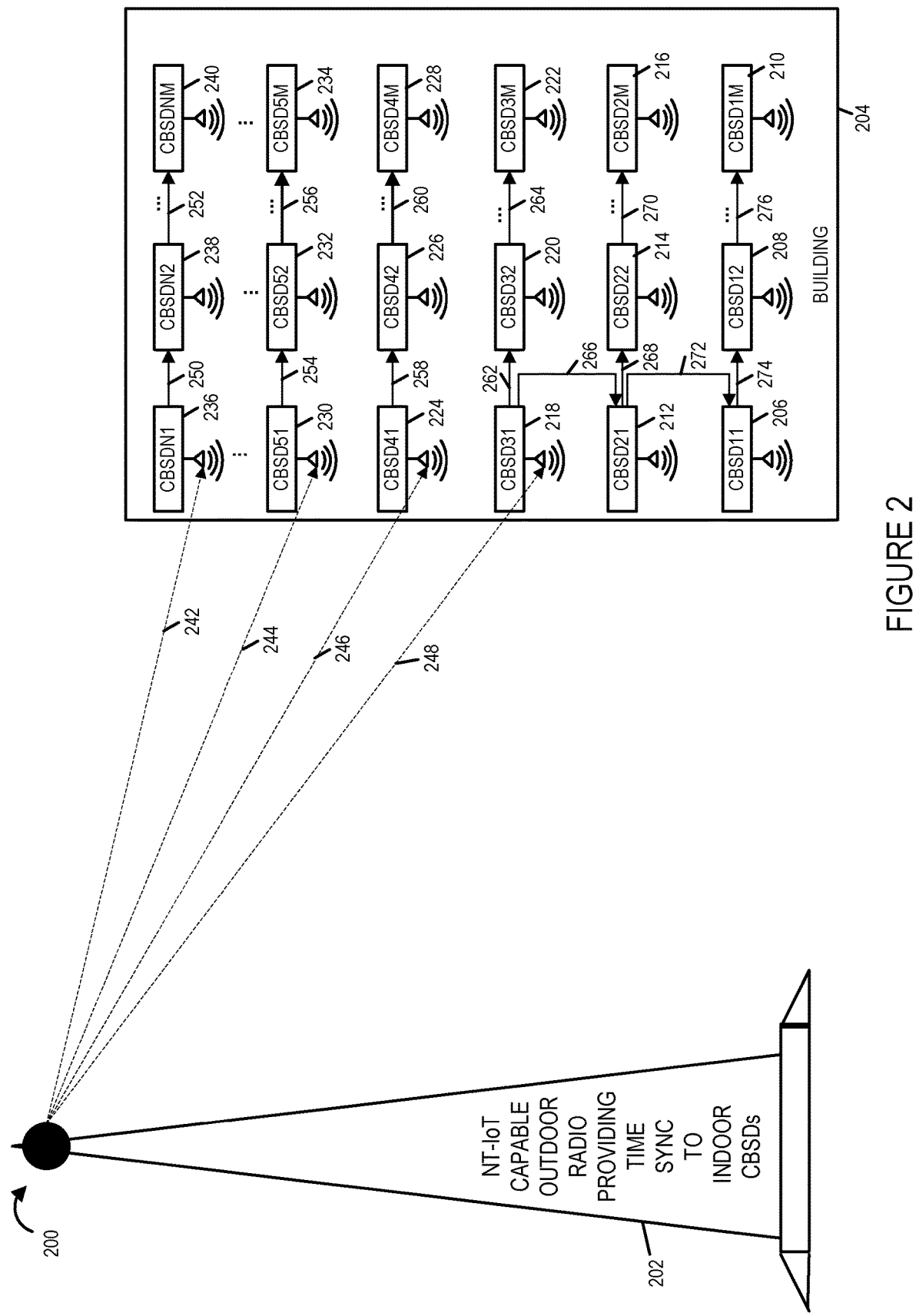
FIG. 2 illustrates a novel approach, in accordance with various embodiments of the present invention, for distributing synchronization information for indoor devices, e.g., in-building TD LTE CBRS Radios.

FIG. 2 illustrates a novel approach, in accordance with various embodiments of the present invention, for distributing synchronization information for indoor devices, e.g., in-building TD LTE CBRS Radios such as indoor CBSDs. Drawing 200 includes exemplary NT-IoT capable outdoor radio 202 and a building 204 including a plurality of NB-IoT capable indoor CBSDs. The plurality of NB-IoT capable indoor CBSDs include: floor 1 CBSDs (CBSD11 206, CBSD12 208, . . . , CBSD1M 210), floor 2 CBSDs (CBSD21 212, CBSD22 214, . . . , CBSD2M 216), floor 3 CBSDs (CBSD31 218, CBSD32 220, . . . , CBSD3M 222), floor 4 CBSDs (CBSD41 224, CBSD42 226, . . . , CBSD4M 228), floor 5 CBSDs (CBSD51 230, CBSD52 232, . . . , CBSD5M 234), . . . , floor N CBSDs (CBSDN1 236, CBSDN2 238, . . . , CBSDNM 240).

NB-IoT capable outdoor radio 202 provides timing synchronization information directly to CBDSN1 236 via NB-IoT signals over wireless link 242. NB-IoT capable outdoor radio 202 provides timing synchronization information directly to CBDS51 230 via NB-IoT signals over wireless link 244. NB-IoT capable outdoor radio 202 provides timing synchronization information directly to CBDS41 224 via NB-IoT signals over wireless link 246. NB-IoT capable outdoor radio 202 provides timing synchronization information directly to CBDS31 218 via NB-IoT signals over wireless link 248. The other CBSDs in building 1204 receive timing synchronization information indirectly from NB-IoT capable outdoor radio 202, e.g., via one of the (CBSDN1 236, CBSD51 230, CBSD41 224, or CBSD 218), and for some indoor CBSDS, additional intermediate CBSDs. The arrows (250, 252, 254, 256, 258, 260, 262, 264, 266, 268, 270, 272, 274, 276) are used to illustrate exemplary paths for conveying the timing synchronization information and may be wired and/or wireless paths. For example, timing synchronization information from outdoor radio 202 is communicated to CBSDN2 238 via CBSDN1 236, as indicated by arrows 242 and 250. As another example, timing synchronization information from outdoor radio 202 is communicated to CBSD21 238 via CBSD31 218, as indicated by arrows 248 and 266.

In this example the indoor CBSDs of the higher floors which are located near the outside of the building facing the outdoor NB-IoT radio 202 are able to receive NB-IoT signals from the outdoor radio 202 and successfully recover the communicated timing synchronization signals. Those indoor CBSDs (236, 230, 224, 218) can, and sometimes do, process the received timing synch packet, generate a new timing sync packet and send the generated new timing synch packet to another indoor CBSD.

Figure 2A:
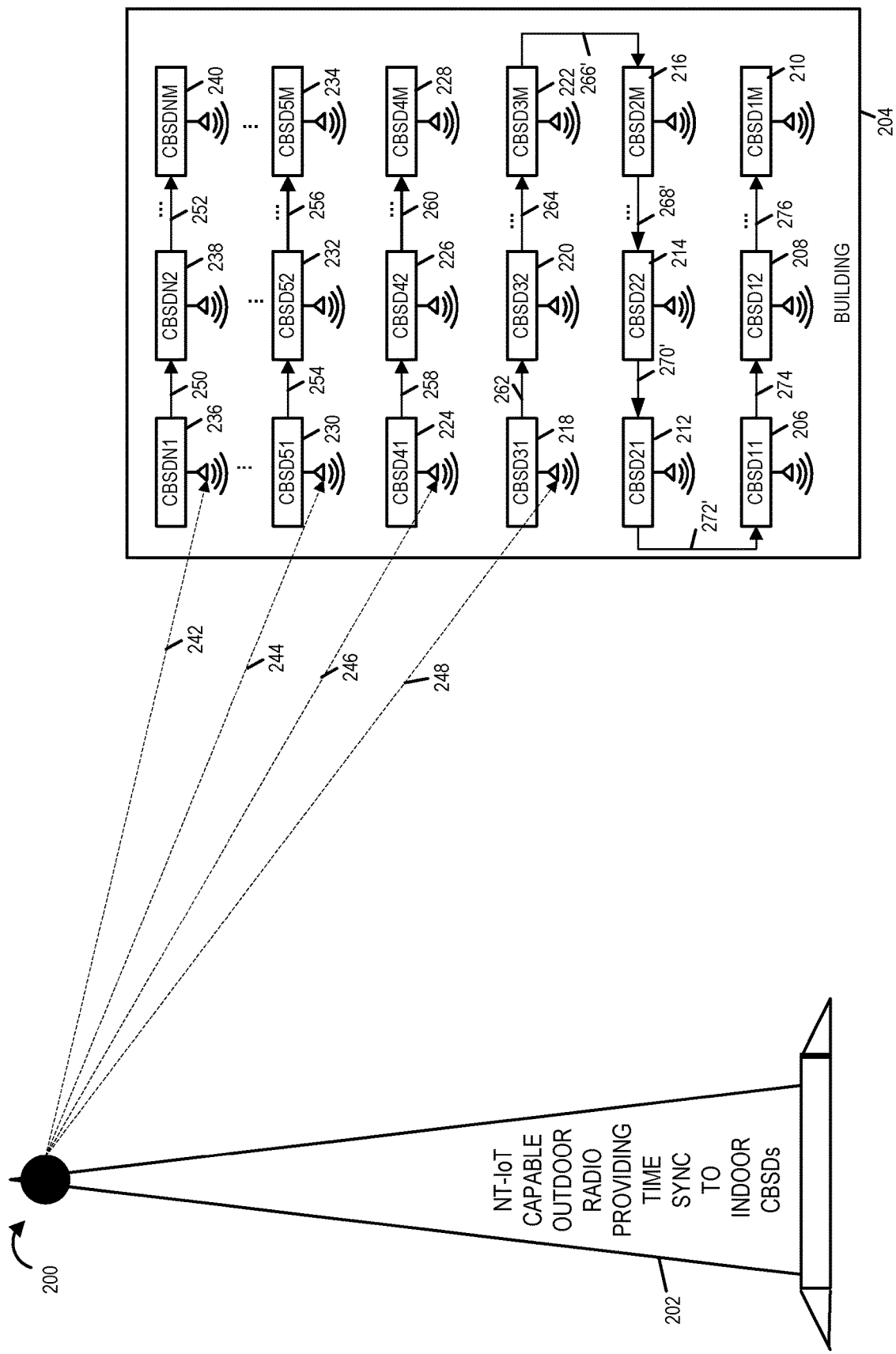
FIG. 2A illustrates alternative distribution paths to distributing timing information within the building of FIG. 2 in accordance with an exemplary embodiment.

In some embodiments, each indoor CBSD in building 204 can, and sometimes does, forward timing information to at most one other CBSD in the building 204. In some such embodiments, each CBSD in building 204 can receive timing information either directly or indirectly from outdoor radio 202. FIG. 2A shows an alternative to the FIG. 2 embodiment. The arrows (250, 252, 254, 256, 258, 260, 262, 264, 266', 268', 270', 272', 274, 276) are used to illustrate exemplary paths for conveying the timing synchronization information and may be wired and/or wireless paths.

In some embodiments, the timing synchronization paths for distributing timing information may, and sometimes do, change over time, e.g., as conditions, e.g., channel conditions, change, e.g., a particular indoor CBSD becomes able or becomes unable to receive and recover timing information directly from the outdoor radio providing timing synchronization information, and/or in response to a failure of one or more indoor CBSDs.

Figure 3:
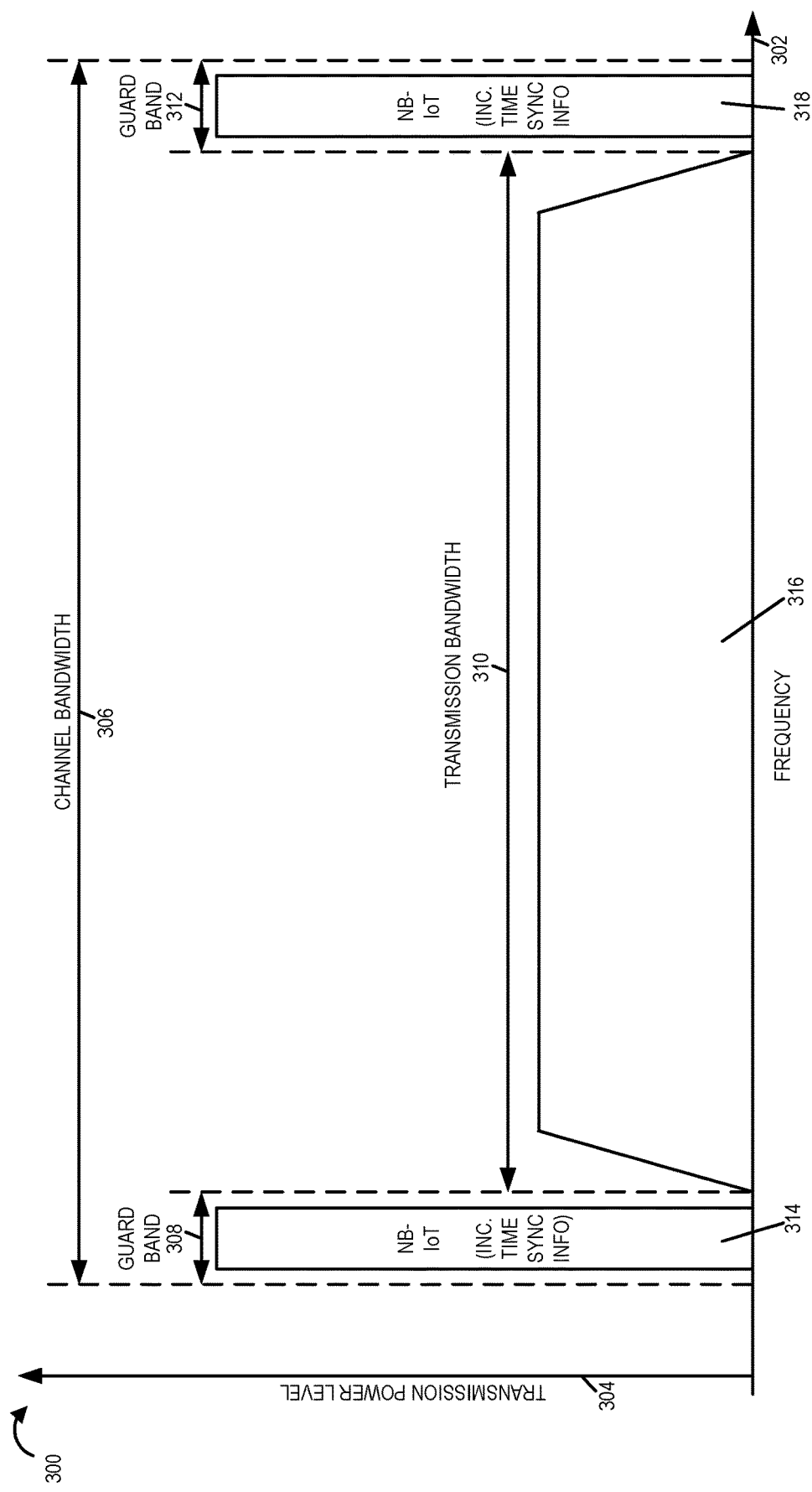
FIG. 3 illustrates an exemplary NB-IoT implementation in guard bands of a Citizens Broadband radio Services Device (CBSD) Priority Access License (PAL), in which timing synchronization information may be, and sometimes is, communicated in the guard bands using NB-IoT signaling, in accordance with an exemplary embodiment.

NB-IoT is a 3rd Generation Partnership Project (3GPP) specification and part of Long-Term Evolution (LTE) release 13 and it is designed for low power wide area (LPWA) networking capabilities. NB-IoT allows transmission of radio signals in a narrow band at high power which enables higher maximum allowable path loss compared to traditional networks. Higher allowable path loss, e.g., 160 dBs, means more coverage and reach in dense building clutter, than with traditional networks FIG. 3 illustrates an exemplary NB-IoT implementation in guard bands of a Citizens Broadband radio Services Device (CBSD) Priority Access License (PAL), in which timing synchronization information may be, and sometimes is, communicated in the guard bands using NB-IoT signaling, in accordance with an exemplary embodiment. Drawing 300 of FIG. 3 includes horizontal axis 302 representing frequency and vertical axis 304 representing transmission power level. Exemplary channel bandwidth 306 includes guard band 308 transmission bandwidth 310 and guard band 312. Traditional network signaling, e.g., CBRS signals, are conveyed via resource 316 corresponding to transmission bandwidth 310.

NB-IoT is a Frequency Division Duplex (FDD) based technology and will not work with CBRS (A Time Division Duplex (TDD) Technology) using the typical transmission bandwidth 310. In order to make NB-IoT work with TDD, two separate frequency bands are needed, this isolation is provided by two guard bands (308, 312) at the opposite ends of the channel bandwidth spectrum 306. NB-IoT signaling, e.g., conveying timing synchronization related signaling, is conveyed via resource 314 corresponding to guard band 308 and resource 318 corresponding to guard band 312.

This approach allows outdoor infrastructure, e.g., an outdoor base stations supporting NB-IoT such as NB-IoT capable radio 202, to be used as the primary source of Synchronization information for indoor CBSDs such as the indoor CBSDs of building 204. LTE coverage of outdoor infrastructure has a maximum path loss of around 120-130 dB. Therefore the reach of the LTE network will be less than that of NB-IoT, with allowable path loss of 160 dBs.

Figure 4:
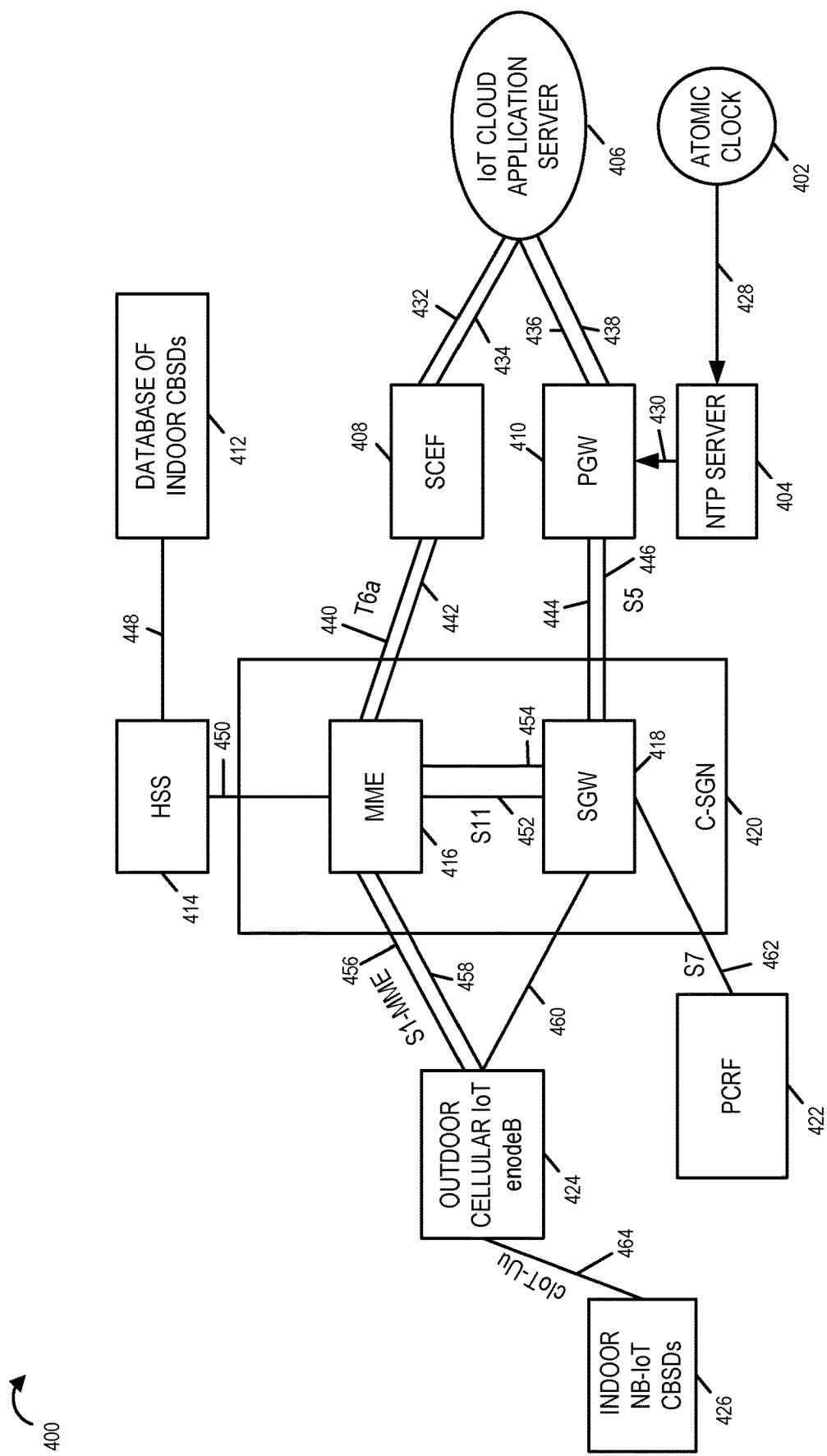
FIG. 4 is a drawing of exemplary system including NB-IoT architecture for providing a synchronization service for indoor CBSDs in accordance with an exemplary embodiment.

FIG. 4 is a drawing of exemplary system 400 including NB-IoT architecture in accordance with an exemplary embodiment. Exemplary system 400 includes architecture for providing a synchronization service for indoor CBSDs in accordance with an exemplary embodiment. Exemplary system 400 includes an atomic clock 402, a Network Time Protocol (NPT) server 404, an IoT cloud application server 406, a Service Capability Exposure Function (SCEF) 408, a Packet Gateway (PGW) 410, a database of indoor Citizens Broadband radio Services Devices (CBSDs) 412, a Home Subscriber Server (HSS) 414, a Mobility Management Entity (MME) 416 and a Serving Gateway (SGW) 418. The MME 416 and SGW 418 are part of a Cellular IoT Serving Gateway Node (C-SGN) 420. Exemplary system 400 further includes a Policy and Charging Rules Function (PCRF) 422, an outdoor cellular IoT eNodeB 424, and indoor NB-IoT CBSDs 426.

Atomic clock 402 provides input timing reference signal 428 to Network Time Protocol (NPT) server 404. NPR server provides output timing reference information 430 to PGW 410 to be communicated to the outdoor cellular IoT eNodeB 428, via C-SGN 420.

IoT cloud application server 406 is coupled to SCEF 408 via links 432, 434. IoT cloud application server 406 is coupled to PGW 410 via links 436, 438. SCEF is coupled to MME 416 via T6a connections 440, 442. PGW 410 is coupled to SGW 418 via S5 connections 444, 446. MME 416 is coupled to SGW 418 via S11 connections 452, 454.

The database of indoor CBSDs 412 is coupled to HSS via link 448. HSS 414 is coupled to MME via link 450.

NNE 416 is coupled to outdoor cellular IoT enodeB 424 via S1-MME connections 456, 458. The outdoor cellular IoT eNodeB 424 is also coupled to SGW 418 via link 460. PCRF 422 is coupled to SGW 418 via S7 connection 462.

The outdoor cellular IoT eNodeB 424 is coupled to the indoor NB-IoT CBSDs 426 via one or more cIoT-Uu interface connections 464.

HSS attached component 414 will keep information of CBSDs that are installed indoor and a database 412 will keep the information as clients with subscription service. This service for special indoor clients, i.e., CBSDs is Time sync information.

Functions running on PCFR 422 and HSS 414 will determine how to charge an indoor CBSD, which is provided one or more services. For example, smart city networks and private LTE networks could be, and in some embodiments are, charged a service fee for a time synchronization service. On the other hand, in some embodiments, if the indoor CBSDs belong to the same service provider network as the service provider network offering the timing synchronization service, those CBSDs could be, and sometimes are waived from the service fee, e.g., with the timing synch service being included as part of a feature of a standard service package.

Figure 5:
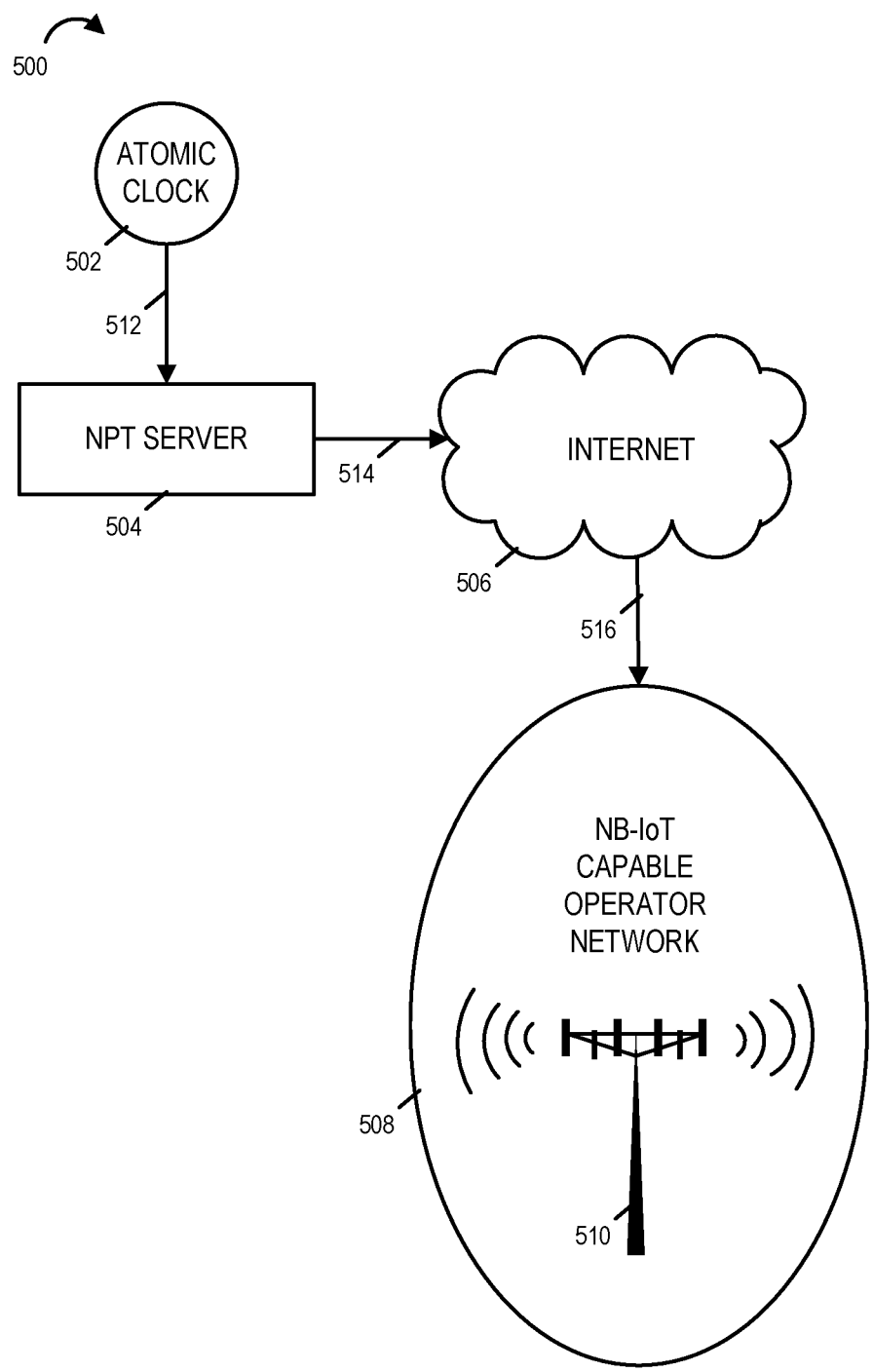
FIG. 5 illustrates Network time Protocol (NTP) over a Narrow Band Internet of Things (NB-IoT) network to distribute timing synchronization information in accordance with an exemplary embodiment.

Drawing 500 of FIG. 5 illustrates NTP over NB-IoT network to distribute clock. Atomic clock 502 outputs timing reference signals 512 to NPT server 504, which generates and outputs timing synchronization signal information 514, directed to NB-IoT capable network operator 508 including outdoor cellular IoT base station 510, e.g., an eNodeB supporting IoT signaling, communicating timing synchronization information, in guard bands. The NPT output signals 514, conveying time synch information, are communicated via Internet 506, and are received at outdoor cellular IoT base station 510 of NB-IoT capable network operator as signals 516. In some embodiments, the atomic clock 502, NPT server 502 and outdoor cellular IoT base station 510 are part of the same service provider network and the output of the NPT server 504 is coupled, via the service provider's network infrastructure, rather than the Internet 506, to the outdoor cellular IoT base station 510. In some embodiments, the same NPT server feeds timing information to a plurality of outdoor cellular IoT base stations, each which provide timing information to a plurality of indoor CBSDs.

In various embodiments, clock information, e.g. timing information for synchronization, derived from an atomic clock is made available as an offered service in NB-IoT, e.g., one of a plurality of different services of IoT cloud application server 406. This is further illustrated in drawing 600 of FIG. 6, in which a first application is time synchronization service application 604, and there are additional applications (application 2 606 and application 3 608).

Retuning to drawing 400 of FIG. 4, database of indoor CBSDs 412 includes information corresponding to each of the indoor CBSDs, e.g., each of indoor CBSDs which are subscribers. Exemplary information included in database 412 includes International Mobile Equipment Identity (IMEI), Media Access Control (MAC) address, serial number of the product, etc. The information stored in database 412 is available to the HSS 414. In some embodiments, database of indoor CBSDs 412 is included within HSS 414, e.g. as a module. In other embodiments, database of indoor CBSDs 412 is a database which is external to HSS 414, and the HSS 414 queries the database 412 to retrieve desired information.

In various embodiments, a subscriber based service, e.g., providing timing synchronization information to indoor CBSDs, running on an application platform within the IoT cloud application server 406 is available to those devices, e.g., indoor CBSDs, that are prescribed to the service.

In some embodiments, synchronization will run as a service for a CBSD network, e.g., a set of indoor CBSDs in a building, from the main network. This service is running as an application shown in FIG. 6, which is the time Synchronization service application 604.

Network Time Protocol (NPT) is capable of providing clock synchronization over packet switched data. A NPT server can be, and sometimes is, deployed within the network or a 3rd party's service an be, and sometimes are, obtained in accordance with various exemplary embodiments. In the example of FIG. 4, NPT server 404 is included as part of the network, e.g., the NB-IoT architecture network. In the example of FIG. 5, NPT server 504 is outside the NPT over NB-IoT network 508.

In the examples of FIG. 4 and FIG. 5, the clock is a stratum 0, i.e., information coming directly from an atomic clock, etc.

Figure 8:
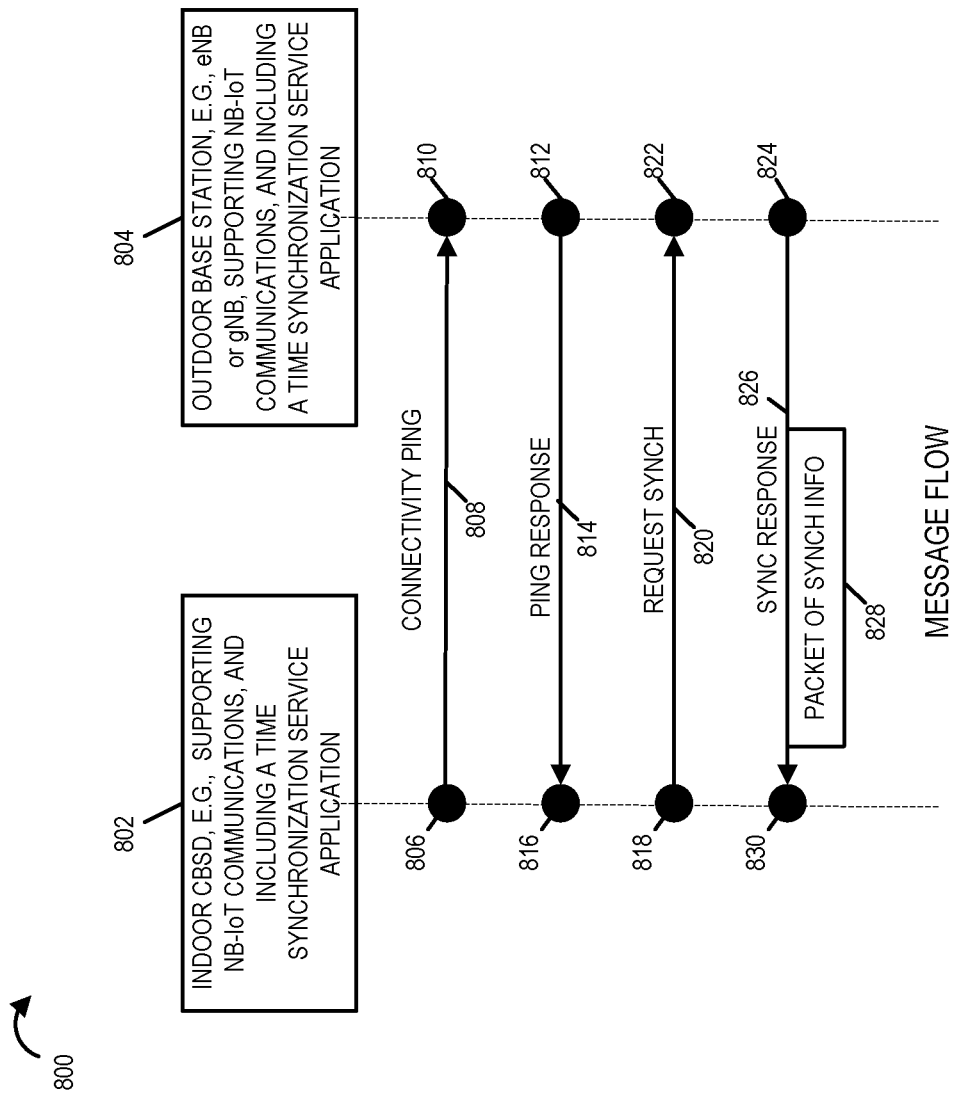
FIG. 8 illustrates an exemplary message flow between an indoor CBSD, supporting NB-IoT communications, and an outdoor base station, supporting NB-IoT communications, said exemplary message flow being communicated using NB-IoT signaling and conveying synchronization related information, in accordance with an exemplary embodiment.

In various embodiments, a CBSD, e.g., an indoor CBSD will be configured to obtain synchronization information by pointing an IP address NB-IoT module. Exemplary message flow between a CBSD, e.g., including in indoor CBSD 802, and the NB-IoT module, e.g., included in outdoor base station 804, are shown in FIG. 8. Drawing 800 of FIG. 8 includes an indoor CBSD 802, e.g., supporting NB-IoT communications and including a time synchronization service application component, e.g., used to request and acquire timing synchronization information from an outdoor base station, and an outdoor base station 804, e.g., an eNB or gNB, supporting NB-IoT communications and including a time synchronization service application component, e.g., used to distribute timing synch information to indoor CBSDs.

Exemplary message flow for sync is shown in drawing 800 of FIG. 8. If the CBSD 802 goes out of sync, CBSD 802 will request another sync. In various embodiments, time synch information is unique to each of the devices, and it is scrambled using Cell-Radio Network Temporary Identifier (C-RNTI). The devices at the receiving end can decode this information to obtain the relevant time sync information. In step 806 indoor CBSD 802 generates and send connectivity ping 808 message to outdoor base station 804. IN step 810 the outdoor base station 804 received the connectivity ping 808. In step 812 the outdoor base station 804 generates and sends a ping response message 814 to indoor CBSD 802. In step 816 the indoor CBSD receives the ping response message 816. in step 818 the indoor base station 802 generates and sends a request synch message 820 to outdoor base station 804. In step 822 the outdoor base station 804 receives the request synch 820. In step 824 the outdoor base station 804 generates and sends a synch response message 826 to indoor CBSD 802, in responses to the received request 820. The sync response message 826 includes a packet of synch information 828.

In some embodiments, connectivity ping message 806 and request synch message 820 are communicated over an NB-IoT resource, e.g., resource 314 corresponding to a first one (308) of a pair of guard bands (308, 312), and ping response message 814 and synch response message 826 are communicated over an NB-IoT resource, e.g., resource 318, in a second one (312) of the pair of guardbands (308, 312).

Figure 7:
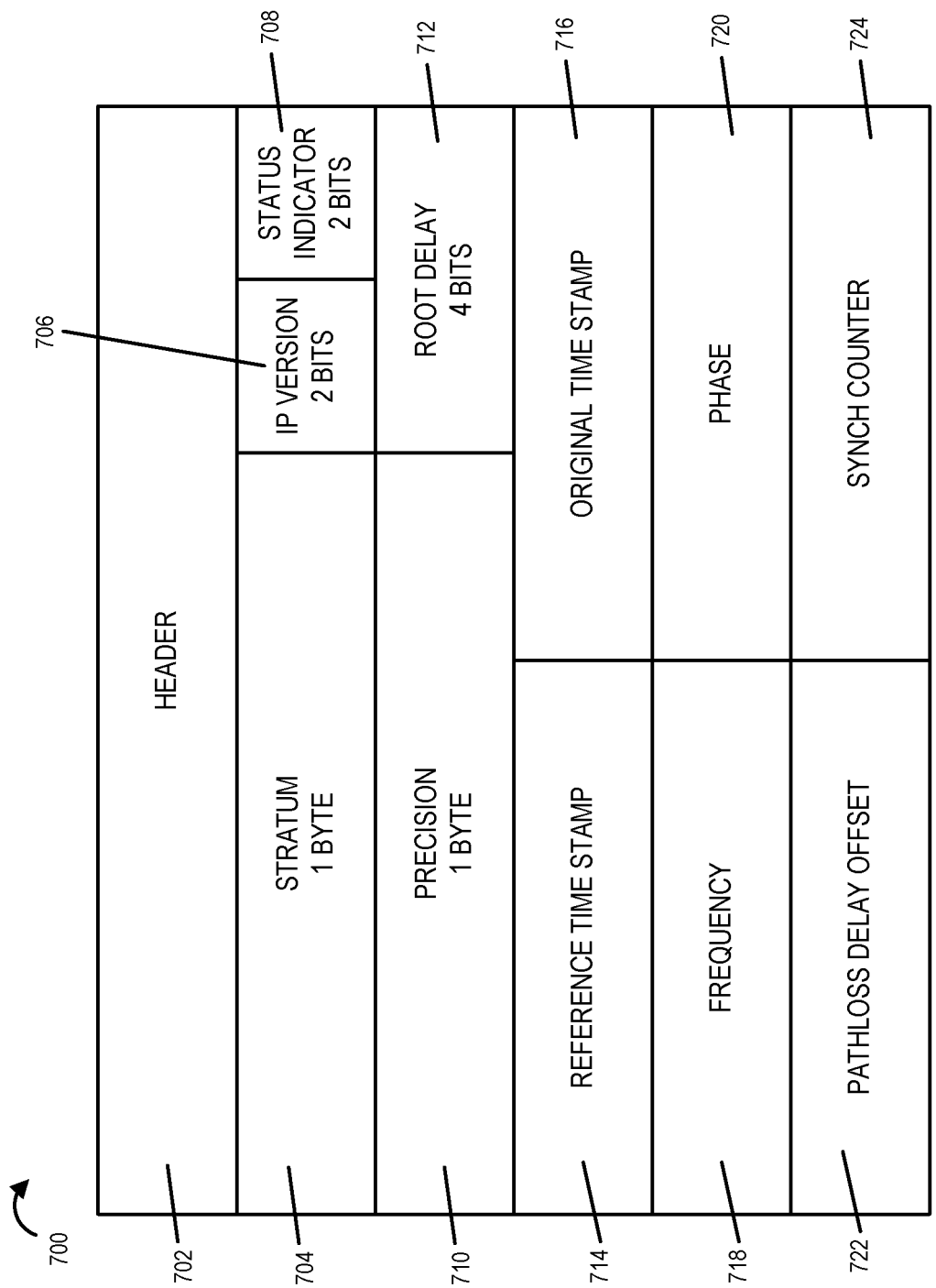
FIG. 7 illustrates an exemplary packet format for conveying synchronization information in accordance with an exemplary embodiment.

FIG. 7 illustrates an exemplary packet format for an exemplary message 700, e.g., synch response message 826 of FIG. 8, carrying a packet of synch information, e.g., packet of synchronization information 828 of FIG. 8.

Exemplary synchronization response message 700 includes a header field 702, a stratum field 704 (e.g., 1 byte), an IP field 708 (e.g., 2 bits), a status indicator field 708, e.g., 2 bits, a precision field 710 (e.g., 1 byte), a root delay field 712 (e.g., 4 bits), a reference time stamp field 714, an original time stamp field 716, a frequency field 718, a phase field 720, a path loss delay offset field 722 and a synch counter field 724. The stratum indicates a level of stratum, e.g., primary, secondary, etc. The status indicator indicates: clock synchronized or not synchronized. Precision communicates the precision of the local clock, e.g. in a power of 2. Root delay communicates round trip time delay to the primary source. Time stamp is the time at which the request departed the client for the CBSD. Path loss delay offset is obtained from channel state information (CSI) which helps in estimating path loss and estimating time delay to reach a device. Synch counter is decremented each time this information is received from another CBSD. For example, a peer to peer establishment of connectivity to share synch information between primary recipient if the synch information, i.e., CBSD31 218 in FIG. 2A, will decrement sync counter before forwarding it the second CBSD, e.g., CBSD32 220, and so forth and so on. The purpose of using the synch counter and decrementing before forwarding to the next hop is to limit the number of hops as the time sensitive information may, and sometimes does, actually become inaccurate due to unexpected path loss delays.

Each of the exemplary fields in exemplary message 700 will now be described.

Header field 702: The header field includes information such as source, destination, type of packet, length of the packet, Frame check sequence for error detection, etc. An example of a header field value will be fairly similar to a MAC header, where destination, source address is given in hex.

Stratum field 704: The stratum field communicates clock level. For example, the value of the stratum communicates one of: primary, secondary (source code for secondary), etc. The value of the stratus is, e.g., a value in the range of 0-255 in decimal.

IP version field 706: The IP version field uses 2 bits for communicating the IP version, e.g., Internet Protocol version 4 (IPv4) or Internet Protocol version 6 (IPv6). For example, a value if 00 in the IO version field communicates IPv4 and a value of 01 in the IP version field communicates IPv6.

Stratus indicator field 710: The stratus indicator field communicates the Stratus indicator: clock synchronized or not synchronized. For example, stratus indicator field value of 00 indicates no synced and a stratus indicator field value of 01 indicates synced, and other values are reserved, Precision field 712: The precision field communicates the precision of the clock in powers of 2. For example a precision field value of 00000001 would represent $2^1$ and so and so forth.

Root delay field 712: The root delay field communicates round trip delay to the primary source.

Reference Time stamp 714: The reference time stamp communicates the time at which the request departed the client for the CBSD.

Original Time Stamp field 716: The original time stamp field communicates a Time stamp originally provided by the source.

Pathloss delay offset field 722: The pathloss delay offset communicated in the pathloss delay offset field is obtained from (channel state information) CSI information which helps in estimating pathloss and estimate time delay to reach a device.

Synch counter field 724: The synch counter field communicates a synch counter which is decremented each time this information is received from another CBSD. For example, in some embodiments in which, a peer to peer establishment of connectivity is used to share synch information between a primary recipient of synch information i.e., a primary CBSD, i.e. CBSD 1, and a secondary CBSD, i.e. CBSD 2, the primary CBSD, i.e., CBSD 1, will decrement the synch counter before forwarding it to the secondary CBSD i.e., CBSD 2, and so on so forth. The purpose of doing this is to limit the number of hops as the time sensitive information may actually, become inaccurate do to unexpected pathloss delays. In one exemplary embodiment a one-byte synch counter field is used to communicate a value in the range 00000000-11111111 (0-255 in decimal). Similarly, in some other embodiments, higher byte fields can be mapped to other numbers that could represent different ways.

Frequency field 718: The frequency field communications frequency of oscillations.

Phase field 720: The phase field communicates the phase of oscillator/wave.

In one example, 2 exemplary packets conveying time sync information use the format of FIG. 7. A first packet is sent from an outdoor base station to a first indoor CBSD, and the first packet is communicated in a sync response message via NB-IoT signals (e.g., see dashed arrow 248 of FIG. 2A. A second packet is subsequently sent from the first indoor CBSD to a second indoor CBSD (e.g., see arrow 262 in FIG. 2A). In both cases the format of the packet will be the same. Some fields will change their values based on how many hops it has gone through etc. For example, the reference time stamp, pathloss delay offset and synch counter, etc., will be different in the second packet with respect to the first packet.

Figure 6:
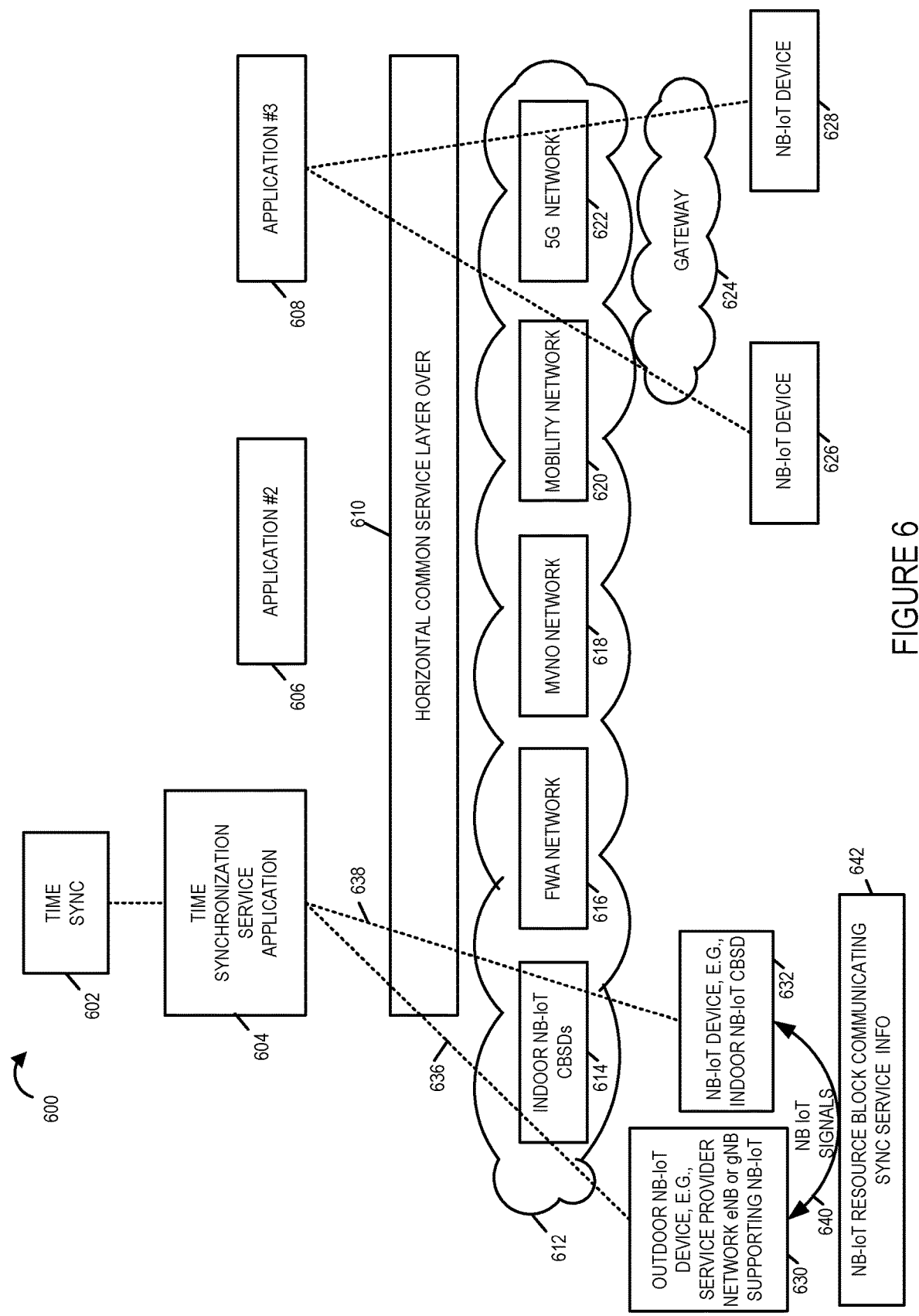
FIG. 6 illustrates an example in which a time synchronization service with a corresponding time synchronization service application, in which synchronization information is communicated, via NB-IoT signals, from an outdoor NB-IoT device, e.g., an outdoor cellular base station supporting NB-IoT communications, to a plurality of indoor CBSDs supporting NB-IoT communications, is one or a plurality of alternative services offered in which information is communicated between devices via NB-IoT signaling, in accordance with an exemplary embodiment.

Exemplary communication flow over a horizontal service layer 610 is shown in drawing 600 of FIG. 6. This timing synchronization service, in some embodiments, is transmitted on a resource block dedicated to synchronize devices. Devices will listen and align their phase, frequency and time of day accordingly.

Drawing 600 of FIG. 6 illustrates that time sync information 602 is distributed to devices subscribing to the time synchronization service. There is a horizontal common server layer 610 over the network 612. Exemplary available services operating under the horizontal common server layer include: i) a time synchronization service corresponding to time synchronization service application 604, e.g. application #1, ii) an application #2 service corresponding to application #2 606, and iii) an application #3 service corresponding to application #3.

Exemplary overall network 612 includes indoor NB-IoT CBSDs 614, e.g., a set of indoor CBSDs in a building, a Fixed Wire Access (FWA) network 616, a Mobile Virtual Network Operator (MVNO) network 618, a mobility network 620 and a 5G network 622.

Exemplary outdoor NB-IoT device 630, e.g., a service provider network eNB or gNB supporting NB-IoT, is, e.g., an outdoor base station supporting NB-IoT signaling which is part of one of the FWA network 616, the MVNO network 618, the mobility network 620 or a 5G network 622. Exemplary NB-IoT device 632, e.g., an indoor CBSD supporting NB-IoT communications, is, e.g., one of the indoor CBSDs in set of CBSDs 614. Both the outdoor NB-IoT device 630 and the NB-IoT device 632, e.g., an indoor CBSD, include a time synchronization service application component, e.g., as indicated by lines 636 and 638. NB-IoT signals 640 are communicated between devices (630, 632), and a NB-IoT resource block 642 is used to communicate synch service information. The communicated synch service information includes, e.g., a Request synch message from device 632 to device 630 and a synch response message from outdoor NB-IoT device 630 to NB-IoT device 632, e.g., an indoor CBSD, communicating a packet of synch information, e.g., in accordance with the packet format of FIG. 7.

Exemplary NB-IoT devices 626 and 628, which subscribe to application #3 service, receive a service related to gateway 624.

Figure 9:
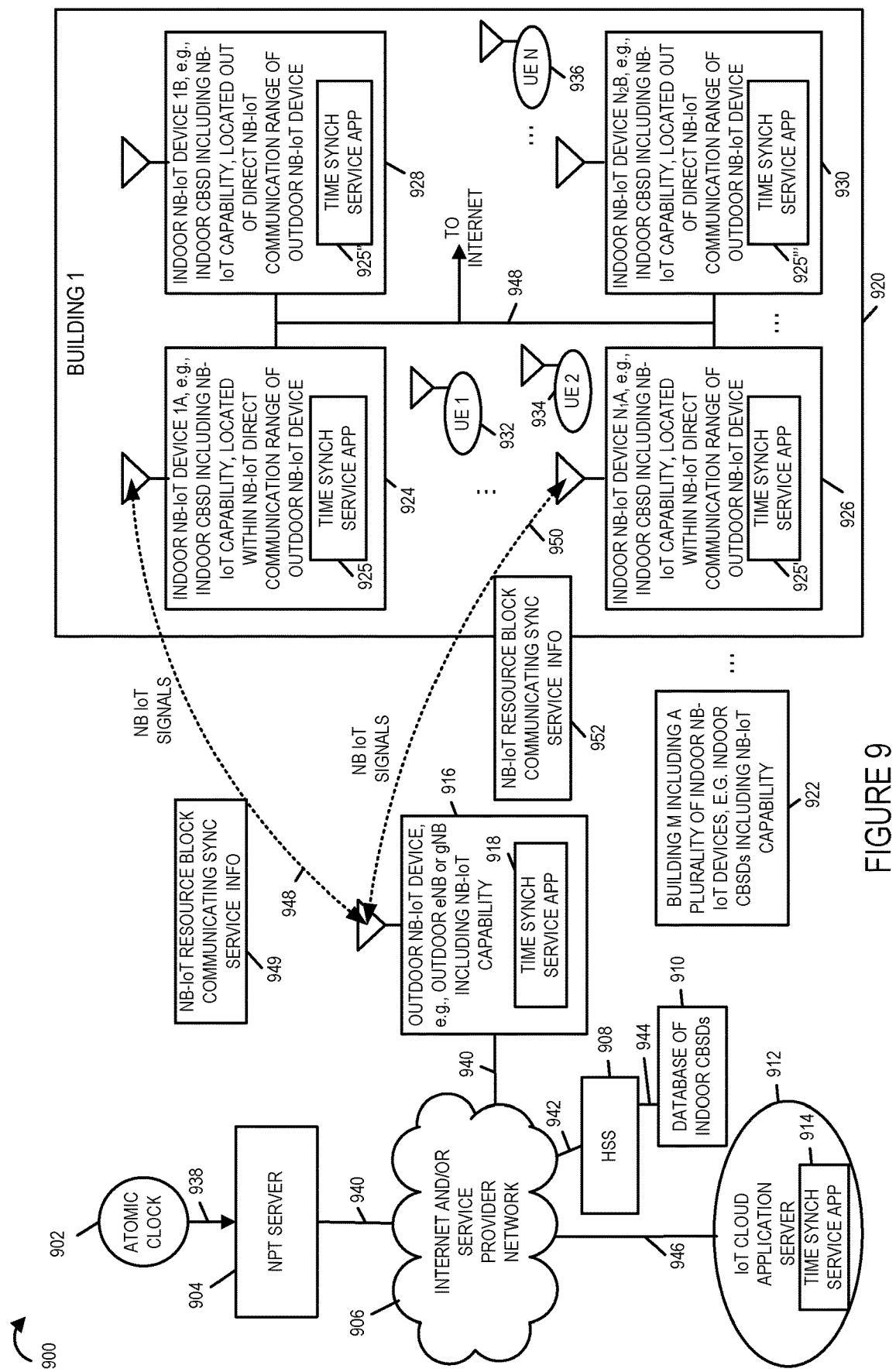
FIG. 9 is a drawing of an exemplary communications system in accordance with an exemplary embodiment.

FIG. 9 is a drawing of an exemplary communications system 900 in accordance with and exemplary embodiment. Exemplary communication system 900 includes an atomic clock 902, a NPT server 904, Internet and/or a service provider network 906, a HSS 908, a database of indoor CBSDs 910, an IoT cloud application server 912 including a time synchronization service application 918, an outdoor NB-IoT device 916, e.g., an outdoor eNB or gNB including NB-IoT capability, including a time synch service application 918, and a plurality of buildings (building 1 902, . . . , building M 922), each of the buildings including a plurality of indoor NB-IoT devices, e.g., indoor CBSDs including NB-IoT capability. The outdoor NB-IoT device 916 serves as a primary source of timing synchronization information for at least some of the indoor NB-IoT devices in each of the buildings (920, 922), with the timing synchronization information being communicated via NB-IoT signals, e.g., in guard bands of a communications channel.

Building 1 920 includes a plurality of indoor CBSDs with NB-IoT capability, located within NB-IoT direct (single hop) communication range of the outdoor NB-IoT device 916 (indoor NB-IoT device 1A 924, . . . , indoor NB-IoT device N1A 926). Building 1 920 also includes a plurality of indoor CBSDs with NB-IoT capability, located out of direct NB-IoT (single hop) communication range of the outdoor NB-IoT device 916 (indoor NB-IoT device 1B 928, . . . , indoor NB-IoT device N2B 930). Each of the indoor NB-IoT devices (924, . . . , 926, 928, . . . , 930) includes a time synchronization service application (925, . . . , 925', 925", . . . , 925'''), respectively.

Exemplary communications system 900 further includes a plurality of user equipment device (UE 1 932, UE 1 934, . . . , UE N 936), which may move throughout the system, attach to a base station, e.g. an outdoor device or an indoor device, and communicate via the base station with other devices.

Atomic clock 902 sends reference timing information 938 to NPT server 904. NPT server 904 is coupled to Internet and/or service provider network 906, via link 940. Internet and/or service provider network 906 is coupled to IoT cloud application server via link 946. HSS is coupled Internet and/or service provider network 906 via link 942. HSS 908 is coupled to database of indoor CBSDs 910 via link 944. In some embodiments, database 910 is included as part of HSS 908. Outdoor NB-IoT device 916 is coupled to internet and/or service provider network 906 via link 941. Timing information from NPT server 904, based on timing information 938 from atomic clock 902, is communicated from NPT server 904 via Internet and/or service provider network 902, to outdoor NB-IoT device, e.g., for distribution to indoor CBSDs via NB-IoT signaling. Exemplary NB-IoT signals 948, transmitted from outdoor NB-IoT device 916, communicate timing synchronization service information 949 to indoor NB-IoT device 1A 924. Exemplary NB-IoT signals 950, transmitted from outdoor NB-IoT device 916, communicate timing synchronization information 952 to indoor NB-IoT device N1A 950. The indoor devices (924, . . . , 926, 928, . . . , 930) are coupled together via a network 948 and/or to the Internet. An indoor device receiving timing synch information from the outdoor NB-IoT device 916, may, and sometimes does, forward the information to other indoor devices NB-IoT devices in the building, e.g., device 928 or device 930.

In some embodiments, an output of the NPT server 904 is coupled directly or via a service provider network infrastructure, e.g. a dedicated service provider network infrastructure, to an input of the outdoor NB-IoT device 916, e.g. providing a reliable and consistent time path delay for routing of timing synchronization information packets between the NPT server 904 and outdoor NB-IoT device 916.

Figure 10A:
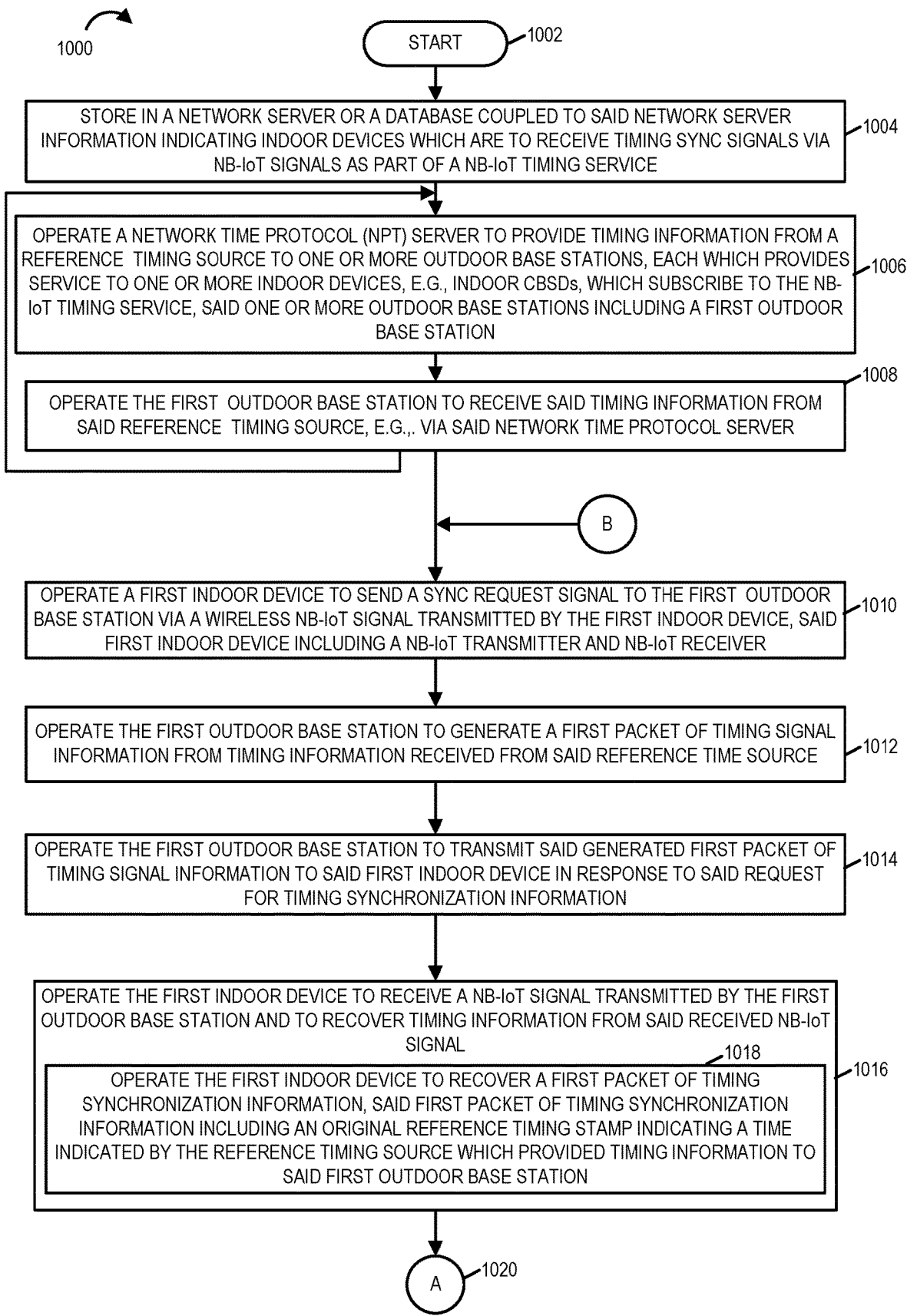
FIG. 10A is a first part of a flowchart of an exemplary method of communicating timing information in accordance with an exemplary embodiment.
Figures 10, 10A, 10B:
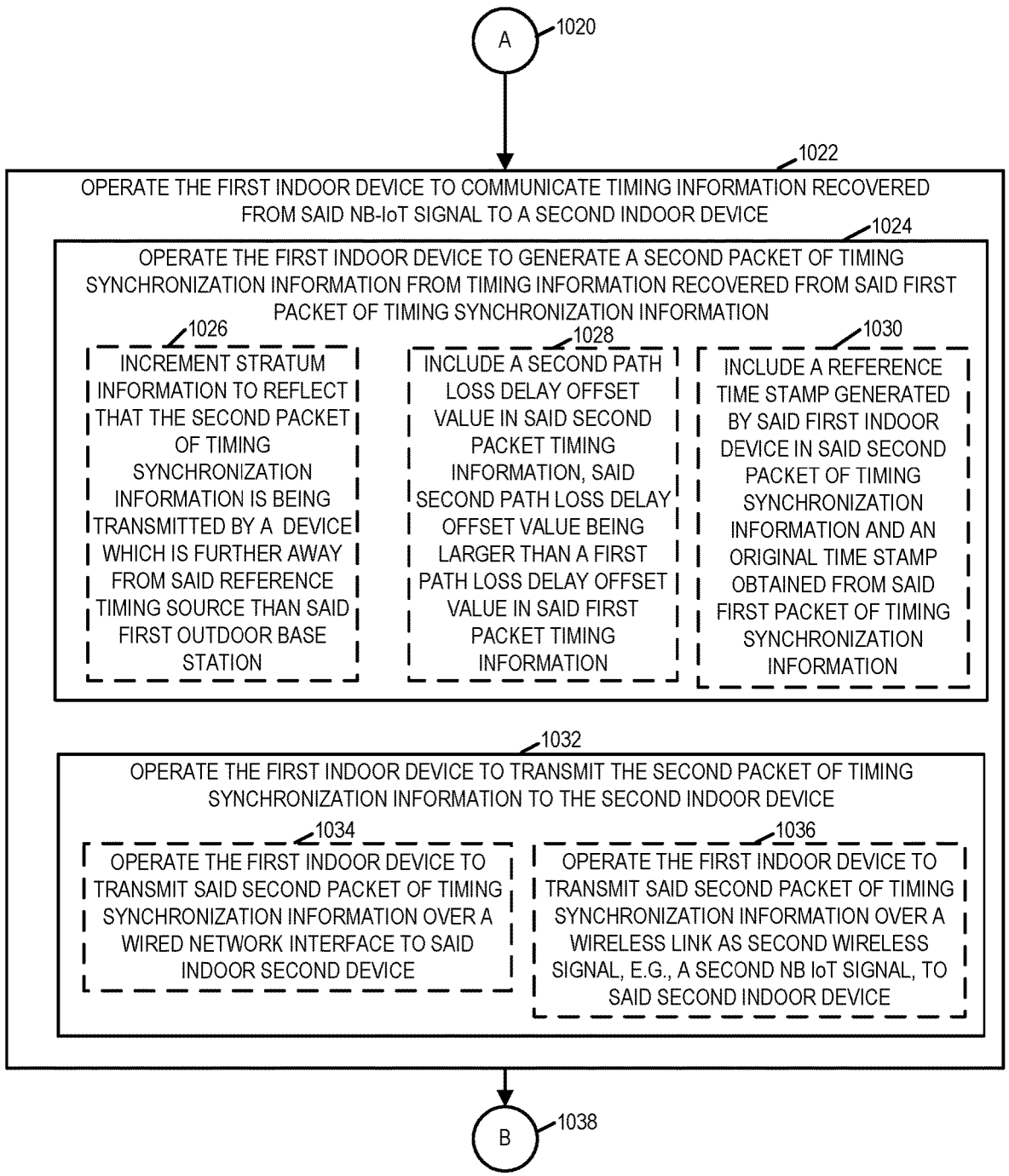
FIG. 10B is a second part of a flowchart of an exemplary method of communicating timing information in accordance with an exemplary embodiment.
FIG. 10 comprises the combination of FIG. 10A and FIG. 10B.

FIG. 10, comprising the combination of FIG. 10A and FIG. 10B, is a flowchart 1000 of an exemplary method of communicating timing information in accordance with an exemplary embodiment. Operation starts in step 1002, e.g., in which an exemplary communications system, e.g., communications system 900 of FIG. 9, is powered on and initialized, and proceeds to step 1004.

In step 1004 a network server, e.g., a HSS server, e.g. HSS server 908, or a database, e.g., database 910, coupled to the network server, stores information indicating indoor devices, e.g., indoor devices 924, . . . , 926, 928, . . . 930, which are to receive timing synch signals via NB-IoT signals as part of a NB-IoT timing service. Operation proceeds from step 1004 to step 1006.

In step 1006 the network timing protocol (NPT) server, e.g., NPT server 904, provides timing information from a reference timing source, e.g., atomic clock 902, to one or more outdoor base stations, which provide service to one or more indoor devices, e.g., indoor CBSDs, which subscribe to the NB-IoT timing service, said one or more outdoor base stations including a first outdoor base station, e.g., outdoor base station 916. Operation proceeds from step 1006 to step 1008.

In step 1008 the first outdoor base station, receives said timing information from said reference timing source, e.g., via said network time protocol (NPT) server. Steps 1006 and 1008 are performed, e.g., repetitively, on an ongoing basis. Operation proceeds from step 1008 to step 1010.

In step 1010 a first indoor device, e.g., indoor NB-IoT device 1A 924, sends a synchronization request signal to the first outdoor base station via a wireless NB-IoT signal transmitted by the first indoor device, said first indoor device including a NB-IoT transmitter and a NB-IoT receiver. Operation proceeds from step 1010 to step 1012. In step 1012 the first outdoor base station generates a first packet of timing signal information from timing information received from said reference timing source. Operation proceeds from step 1012 to step 1014.

In step 1014 the first outdoor base station transmits said generated first packet of timing signal information to said first device in response to said received request for timing synchronization information. Operation proceeds from step 1014 to step 1016.

In step 1016 the first indoor device receives a NB-IoT signal transmitted by the first outdoor base station and recovers timing information from said received NB-IoT signal. Step 1016 includes step 1018 in which the first indoor device recovers a first packet of timing synchronization information, said first packet of timing synchronization information including an original reference timing stamp indicating a time indicated by the reference timing source which provided timing information to said first outdoor base station. In some embodiments, the first packet of timing synchronization information further includes a first stratum indicating the level of proximity (e.g., primary, secondary, etc.) to the reference timing source.

In some such embodiments, the first packet timing synchronization information further includes a first path loss delay offset and a synch counter. In some such embodiments, the first path loss delay offset is obtained from channel state information (CSI) which helps in estimating path loss and estimating time delay to reach a device. In some embodiments, the synch counter is decremented each time this information is received from another CBSD. For example, a peer to peer establishment of connectivity to share sync information between the primary recipient of the synch information, e.g., a first CBSD, will decrement sync counter before forwarding it to the secondary CBSD, i.e., CBSD 2, and so on and so forth. The purpose of doing this is to limit the number of hops as the time sensitive information may actually become inaccurate do to unexpected path loss delays. Operation proceeds from step 1016, via connecting node A 1020, to step 1022.

In some embodiments, the first packet timing information includes precision information indicating the precision of the local clock, e.g., in a power of 2. In some embodiments, the first timing packet further includes a root delay indicating a round trip delay to the primary source.

In some embodiments, the first packet timing information includes a reference time stamp indicating a reference time stamp value, frequency information and phase information.

In step 1022 the first indoor device communicates timing information recovered from said NB-IoT signal to a second indoor device. Step 1022 includes step 1024 and 1030. In step 1024 the first indoor device generates a second packet of timing information from timing information recovered from said first packet of timing synchronization information. Step 1024 includes one or more or all of steps 1026, 1028 and 1030. In step 1026 the first indoor device increments stratum information to reflect that the second packet of timing synchronization information is being transmitted by a device which is further away from said reference timing source than said first outdoor base station. In step 1028 the first indoor device includes a second path loss delay offset value in said second packet timing information, said second path loss delay value being larger than a first path loss delay offset value in said first packet timing information. In step 1030 the first indoor device includes a reference time stamp value generated by said first indoor device in said second packet of timing synchronization information and an original time stamp obtained from said first packet of timing synchronization information. Operation proceeds from step 1024 to step 1032.

In step 1032 the first indoor device transmits the second packet of timing synchronization information to the second indoor device. In some embodiments, step 1032 includes step 1034 or step 1036. In step 1034 the first indoor device transmits the second packet of timing synchronization information to the second indoor device over a wired network interface. In step 1036 the first indoor device transmits the second packet of timing synchronization information to the second indoor device over a wireless link as a second wireless signal, e.g., a second NB-IoT signal.

In some embodiments, the first outdoor base station is an eNB base station with a NB-IoT transmitter. In some embodiments, the first outdoor base station is a gNB base station with a NB-IoT transmitter. In some embodiments, the first outdoor base station is a CBSD category B base station. In some embodiments, the first outdoor base station is a cellular base station supporting NB-IoT communications.

In some embodiments, the first and second indoor base stations are CBSD base stations. In some embodiments, the first indoor base station is a first CBSD category A base station. In some embodiments the second indoor base station is a second CBSD category A base station.

In some embodiments, the second indoor device is located on a different floor of a building than said first indoor device, said first and second indoor devices being located in the same building.

In some embodiments, the second indoor device is located in the same building as the first indoor device, e.g., on the same floor or an adjacent floor of the same building in which the first indoor device is located, and is within wireless signal range, e.g., NB-IoT wireless signal range, of the first indoor device, but outside the NB-IoT wireless signal range of the first outdoor base station.

Figure 11:
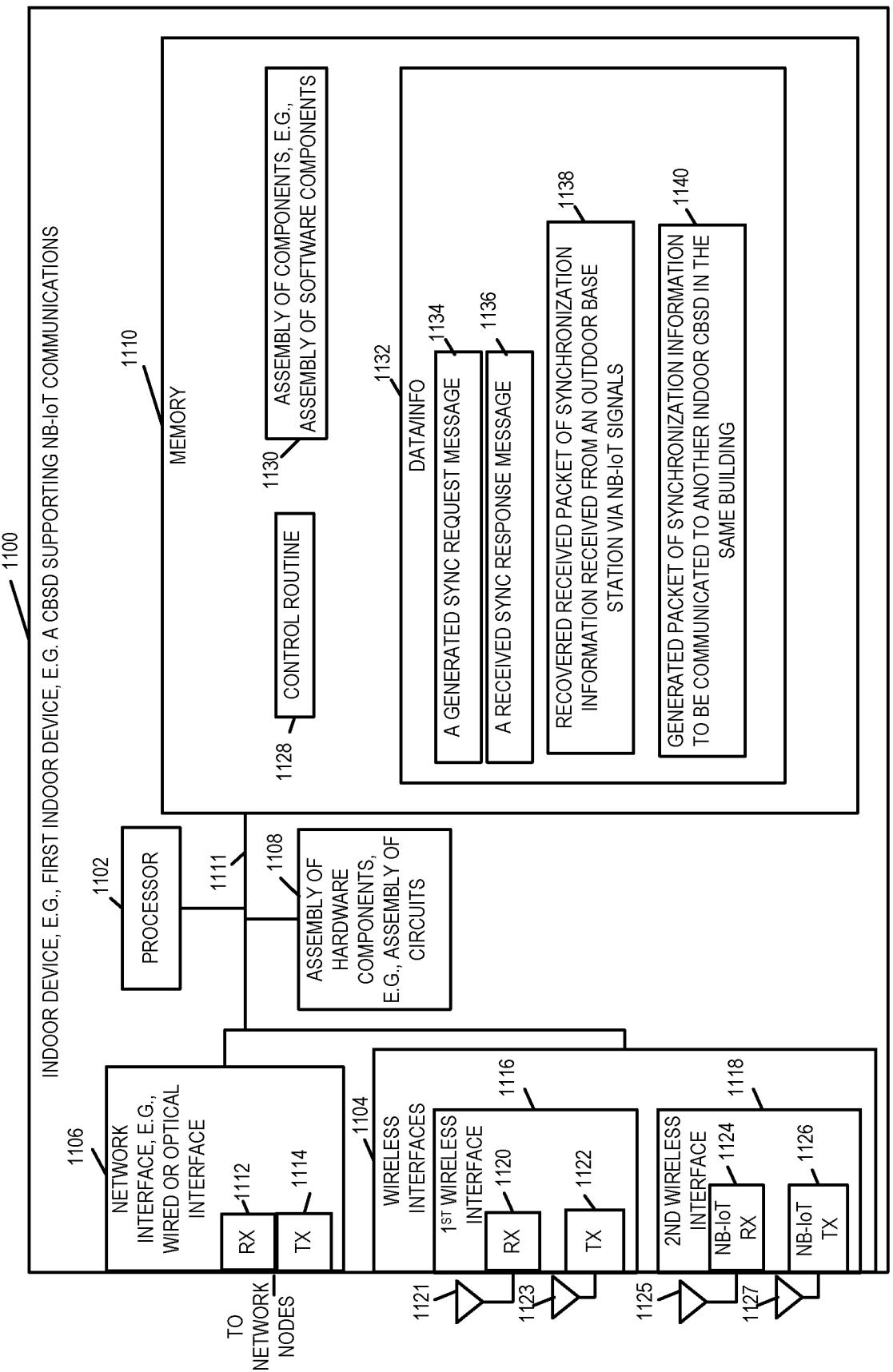
FIG. 11 is a drawing of an exemplary first indoor device, e.g., a CBSD supporting NB-IoT communications, in accordance with an exemplary embodiment.

FIG. 11 is a drawing of an exemplary indoor device 1100, e.g., a first indoor device, e.g., a CBSD supporting NB-IoT communications, in accordance with an exemplary embodiment. Exemplary indoor device 1100 is, e.g. on of the indoor CBSDs of FIGS. 2 and 2A, one of the indoor CBSDs 426 of FIG. 4, NB-IoT device 632 of FIG. 6, e.g., an indoor NB-IoT CBSD, indoor CBSD 802 of FIG. 8, one of the indoor NB-IoT devices (924, . . . , 926) of FIG. 9, one of the indoor CBSDs in sets (2112, 2114, 2116, 2218, 2220, . . . , 2122) of FIG. 21 or an indoor device, e.g., an indoor CBSD, supporting NB-IoT signaling implementing one or more steps of the method of flowchart 1000 of FIG. 10.

Exemplary indoor device 1100, e.g. indoor CBSD supporting NB-IoT, includes a processor 1102, e.g., a CPU, a wireless interface 1104, a network interface 1106, e.g., a wired or optical interface, an assembly of hardware components 1108, e.g., an assembly of circuits, and memory 1110 coupled together via bus 1111 over which the various elements interchange data and information.

Network interface 1106 includes a receiver 1112 and a transmitter 1114, via which the indoor device 1100, e.g., a CBSD, may receive and send signals to other devices, e.g., other indoor CBSDs, other network nodes, etc., a backhaul network, and/or the Internet.

Wireless interfaces 1104 includes a 1st wireless interface 1116 and a second wireless interface 1118, is a NB-IoT wireless interface. 1st wireless interface 1116 includes a wireless receiver 1120 and a wireless transmitter 1122. Wireless receiver 1120 is coupled to receive antenna 1121, via which the indoor device, 1100, e.g., a CBSD, receives wireless signals, e.g., wireless signals from UEs. Wireless transmitter 1122 is coupled to transmit antenna 1123, via which the indoor device 1100, e.g., an indoor CBSD, transmits wireless signals, e.g., wireless signals to UEs. In some embodiments the same antenna is used for transmit and receive. In some embodiments, a plurality of antennas or antenna elements are used for transmit and/or receive.

2nd wireless interface 1118, which is a NB-IoT interface, includes a NB-IoT wireless receiver 1124 and a NB-IoT wireless transmitter 1126. NB-IoT wireless receiver 1124 is coupled to receive antenna 1125, via which the indoor device, 1100, e.g., a CBSD, receives NB-IoT wireless signals, e.g., NB-IoT wireless signals from an outdoor cellular base station communicating timing sync information, e.g., in a packet of synchronization information in a sync response message. NB-IoT wireless transmitter 1126 is coupled to transmit antenna 1127, via which the indoor device, 1100, e.g., a CBSD, transmits NB-IoT wireless signals, e.g., NB-IoT wireless signals to an outdoor cellular base station communicating a sync request message. In some embodiments the same antenna is used for transmit and receive with regard to NB-IoT signals. In some embodiments, a plurality of antennas or antenna elements are used for transmit and/or receive with regard to NB-IoT signals.

In some embodiments the NB-IoT capabilities are incorporated in the 1st wireless interface and the 1st wireless interface supports NB-IoT signaling in addition to its regular signaling capabilities, e.g., used for data/information communications with UEs.

Memory 1100 includes a control routine 1128, an assembly of components 1130, e.g., an assembly of software components, and data/information 1132. Data/information includes a generated sync request message 1134 to be sent to an outdoor base station via NB-IoT signals, a received sync response message 1136 received from an outdoor base station by the NB-IoT receiver, a recovered received packet of synchronization information 1138 received from an outdoor base station via NB-IoT signaling, and a generated packet of synchronization information 1140 to be send to another CBSD in the same building.

Figure 12:
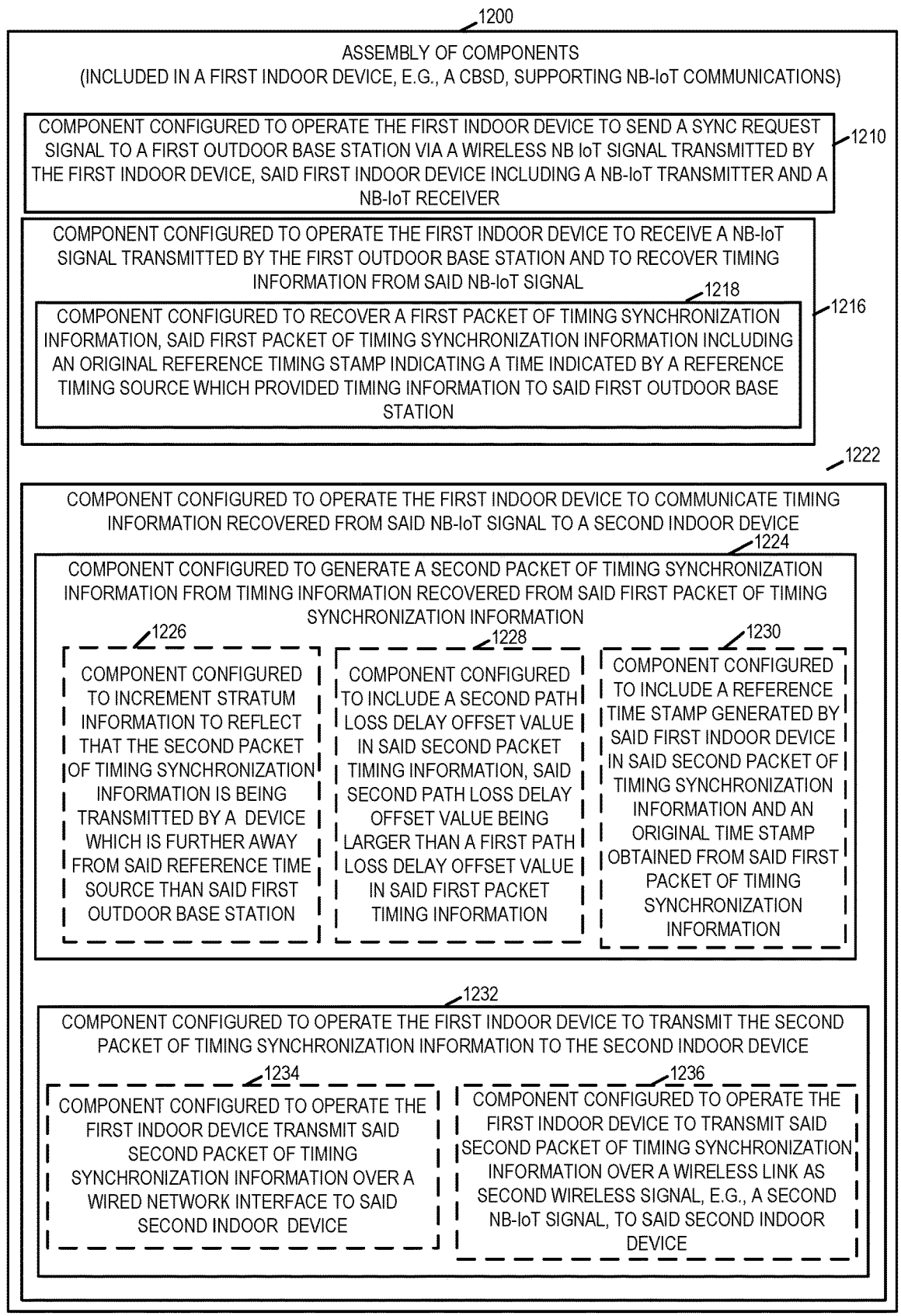
FIG. 12 is a drawing of an exemplary assembly of components which may be included in an exemplary first indoor device, e.g., a CBSD supporting NB-IoT communications, in accordance with an exemplary embodiment.

FIG. 12 is a drawing of an exemplary assembly of components 1200 which may be included in an exemplary first indoor device, e.g., a CBSD supporting NB-IoT communications, in accordance with an exemplary embodiment.

Figure 21:
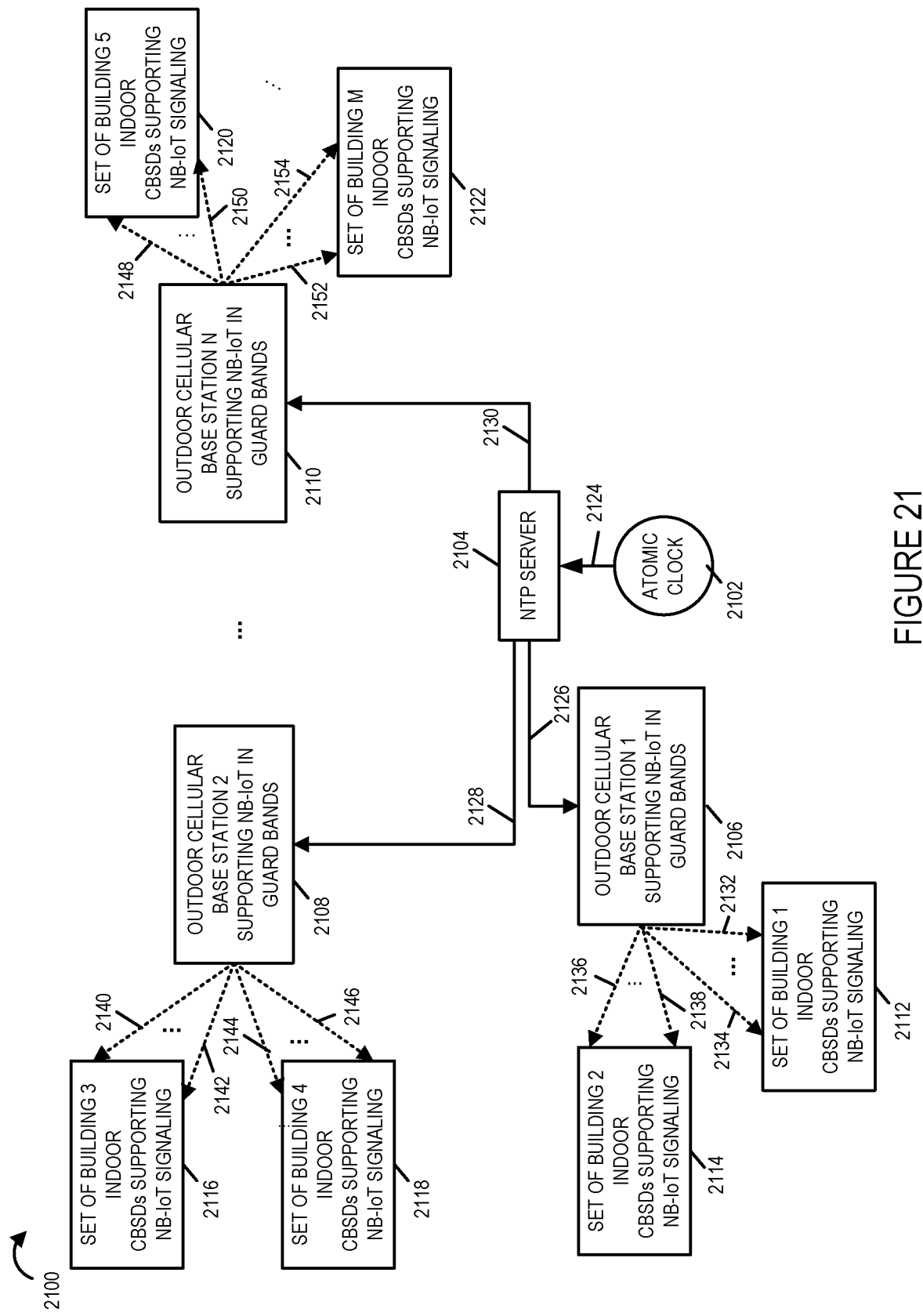
FIG. 21 is a drawing illustrating the distribution of timing synchronization information in an exemplary communications system in accordance with an exemplary embodiment.

Assembly of components 1200 can be, and in some embodiments is, used in one or more of the indoor CBSDs supporting NB-IoT of FIG. 2 or FIG. 2A, one or more of the indoor NB-IoT CBSDs 426 of FIG. 4, one or more on indoor NB-IoT CBSDs 614 such as device 622 of FIG. 6, indoor CBSD 802 of FIG. 8, one or more of the indoor NB-IoT devices (924, . . . , 926, 928, . . . , 930) of FIG. 9, a first indoor device, e.g., an indoor CBSD implementing steps of flowchart 1000 of FIG. 10, indoor device 1100 of FIG. 11, e.g., a first indoor CBSD supporting NB-IoT communications, and/or one or more of the indoor CBSDs supporting NB-IoT of sets of indoor CBSDs supporting NB0IoT signaling (2116, 2118, 2114, 2112, 2120, 2122) of FIG. 21. The components in the assembly of components 1200 can, and in some embodiments are, implemented fully in hardware within the processor 1102, e.g., as individual circuits. The components in the assembly of components 1200 can, and in some embodiments are, implemented fully in hardware within the assembly of components 1108, e.g., as individual circuits corresponding to the different components. In other embodiments some of the components are implemented, e.g., as circuits, within the processor 1102 with other components being implemented, e.g., as circuits within assembly of components 1108, external to and coupled to the processor 1102. As should be appreciated the level of integration of components on the processor and/or with some components being external to the processor may be one of design choice. Alternatively, rather than being implemented as circuits, all or some of the components may be implemented in software and stored in the memory 1110 of the indoor device, e.g., CBSD supporting NB-IoT communications, with the components controlling operation of the indoor device, e.g., the CBSD, to implement the functions corresponding to the components when the components are executed by a processor, e.g., processor 1102. In some such embodiments, the assembly of components 1200 is included in the memory 1210 as assembly of components 1130. In still other embodiments, various components in assembly of components 1200 are implemented as a combination of hardware and software, e.g., with another circuit external to the processor 1102 providing input to the processor 1102 which then under software control operates to perform a portion of a component's function. While processor 1102 is shown in the FIG. 11 embodiment as a single processor, e.g., computer, it should be appreciated that the processor 1102 may be implemented as one or more processors, e.g., computers.

When implemented in software the components include code, which when executed by the processor 1102, configure the processor 1102 to implement the function corresponding to the component. In embodiments where the assembly of components 1200 is stored in the memory 1110, the memory 1110 is a computer program product comprising a computer readable medium comprising code, e.g., individual code for each component, for causing at least one computer, e.g., processor 1102, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 12 control and/or configure the indoor device 1100, e.g., a CBSD, or elements therein such as the processor 1102, to perform the functions of corresponding steps illustrated and/or described in the method of one or more of the flowcharts, signaling diagrams and/or described with respect to any of the Figures. Thus the assembly of components 1200 includes various components that perform functions of corresponding one or more described and/or illustrated steps of an exemplary method, e.g., steps of the method of flowchart 1000 of FIG. 10 and/or described or shown with respect to any of the other figures.

Assembly of components 1200 includes a component 1210 configured to operate the first indoor device to send a synchronization request signal to a first outdoor base station via a wireless NB-IoT signal transmitted by the first indoor device, said first indoor device including a NB-IoT transmitter and a NB-IoT receiver, and a component 1216 configured to operate the first indoor device to receive a NB-IoT signal transmitted by the first outdoor base station and to recover timing information from said NB-IoT signal. Component 1216 includes a component 1218 configured to recover a first packet of timing synchronization information including an original reference timing stamp indicating a time indicated by a reference timing source which provided timing information to said first outdoor base station.

Assembly of components 1200 further includes a component 1222 configured to operate the first indoor device to communicate timing information recovered from said NB-IoT signal to a second indoor device. Component 1222 includes a component 1224 configured to generate a second packet of timing synchronization information from timing information recovered from said first packet of timing synchronization information. Component 1224 includes one or more or all of: a component 1226 configured to increment stratum information to reflect that the second packet of timing synchronization information is being transmitted by a device which is further away from said reference timing source than said first outdoor base station, a component 1228 configured to include a second path loss delay offset value in said second packet timing information, said second path loss delay offset value being larger than a first path loss delay offset value in said first packet timing information, and a component 1230 configured to include a reference time stamp generated by said first indoor device in said second packet of timing synchronization information and an original time stamp obtained from said first packet of timing synchronization information.

Assembly of components 1200 further includes a component 1232 configured to operate the first indoor device to transmit the second packet of timing synchronization information to the second indoor device. Component 1232 includes a component 1234 configure to operate the first indoor base station to transmit the second packet of timing synchronization information over a wired network interface to said second indoor device and a component 1236 configured to operate the first indoor device to transmit said second packet of timing synchronization information over a wireless link as a second wireless signal, e.g. a second NB-IoT signal to said second indoor device.

Figure 13:
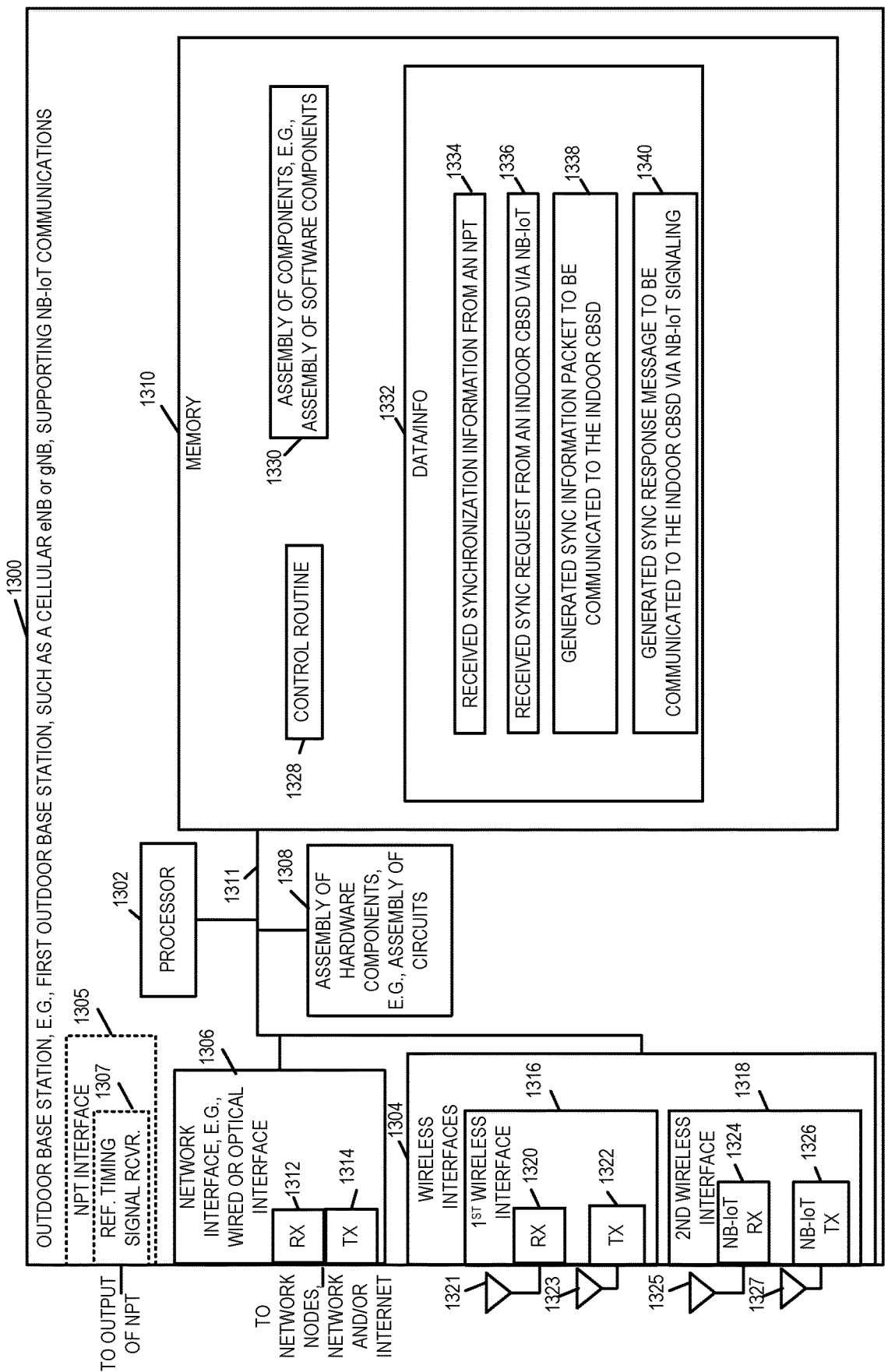
FIG. 13 is a drawing of an exemplary first outdoor base station, e.g., a first outdoor base station supporting NB-IoT communications, in accordance with an exemplary embodiment.

FIG. 13 is a drawing of an exemplary first outdoor base station 1300, e.g., a first outdoor base station supporting NB-IoT communications, e.g., a cellular eNB or gNB supporting NB-IoT communications, e.g., in guard bands, in accordance with an exemplary embodiment.

Exemplary outdoor base station 1300 is, NB-IoT capable outdoor radio 202 of FIG. 2 and FIG. 2A, outdoor cellular IoT eNode B 424 of FIG. 4, NB-IoT capable operator network outdoor base station 510 of FIG. 5, NB-IoT capable BS outdoor NB-IoT device 630 of FIG. 6, e.g., a service provider network eNB or gNB supporting NB-IoT, outdoor base station 804 of FIG. 8, outdoor NB-IoT device 916 of FIG. 9, one of the outdoor cellular base station supporting NB-IoT (2106, 2108, . . . , 2110) of FIG. 21 or an outdoor device, e.g., an outdoor base station supporting NB-IoT signaling implementing one or more steps of the method of flowchart 1000 of FIG. 10.

Exemplary outdoor base station 1300, e.g. a cellular eNB or supporting NB-IoT communications, includes a processor 1302, e.g., a CPU, a wireless interface 1304, a network interface 1306, e.g., a wired or optical interface, an assembly of hardware components 1308, e.g., an assembly of circuits, and memory 1310 coupled together via bus 1311 over which the various elements interchange data and information. In some embodiments, the outdoor base station 1300 further includes a NPT interface 1305 coupled to bus 1311. NPT interface 1305 includes a reference timing signal receiver 1307 configured to receive reference timing source information from the output of a NPT, e.g., via a dedicated connection or via a service provider network connection path having a stable path delay time for packets communicated between the NPT and the outdoor base station 1300. In some embodiments, optional NPT interface 1305 is not included and the timing reference information signals from the NPT are communicated over the Internet and/or a service provider network, via network interface 1306.

Network interface 1306 includes a receiver 1312 and a transmitter 1314, via which the outdoor base station 1300, may receive and send signals to other devices, e.g., servers such as a NPT server, other base stations, other network nodes, etc., via a service provider network, a backhaul network, and/or the Internet.

Wireless interfaces 1304 includes a 1st wireless interface 1216 and a second wireless interface 1218, which is a NB-IoT wireless interface. 1st wireless interface 1316 includes a wireless receiver 1320 and a wireless transmitter 1322. Wireless receiver 1320 is coupled to receive antenna 1321, via which the outdoor base station 1300 receives wireless signals, e.g., wireless signals from UEs using the outdoor base station as a current point of network attachment. Wireless transmitter 1322 is coupled to transmit antenna 1323, via which the outdoor base station 1300 transmits wireless signals, e.g., wireless signals to UEs using the outdoor base station as a point of network attachment. In some embodiments the same antenna is used for transmit and receive. In some embodiments, a plurality of antennas or antenna elements are used for transmit and/or receive.

2nd wireless interface 1318, which is a NB-IoT interface, includes a NB-IoT wireless receiver 1324 and a NB-IoT wireless transmitter 1326. NB-IoT wireless receiver 1324 is coupled to receive antenna 1325, via which the outdoor base station 1300 receives NB-IoT wireless signals, e.g., NB-IoT wireless signals from an indoor CBSD, e.g., communicating a sync request message. NB-IoT wireless transmitter 1326 is coupled to transmit antenna 1327, via which the outdoor base station 1300 transmits NB-IoT wireless signals, e.g., NB-IoT wireless signals including a sync response message communicating a packet of sync information to an indoor CBSD. In some embodiments the same antenna is used for transmit and receive with regard to NB-IoT signals. In some embodiments, a plurality of antennas or antenna elements are used for transmit and/or receive with regard to NB-IoT signals.

In some embodiments the NB-IoT capabilities are incorporated in the 1st wireless interface and the 1st wireless interface supports NB-IoT signaling in addition to its regular signaling capabilities, e.g., used for data/information communications with UEs.

Memory 1300 includes a control routine 1328, an assembly of components 1330, e.g., an assembly of software components, and data/information 1332. Data/information 1332 includes received synchronization information from an NPT 1334, a received sync request 1334 from an indoor CBSD which was communicated via NB-IoT signals, a generated sync information packet 1338 to be communicated to the indoor CBSD, and a generated sync response message 1340 including the generated sync information packet, to be communicated to the indoor CBSD via NB-IoT signaling.

Figure 14:
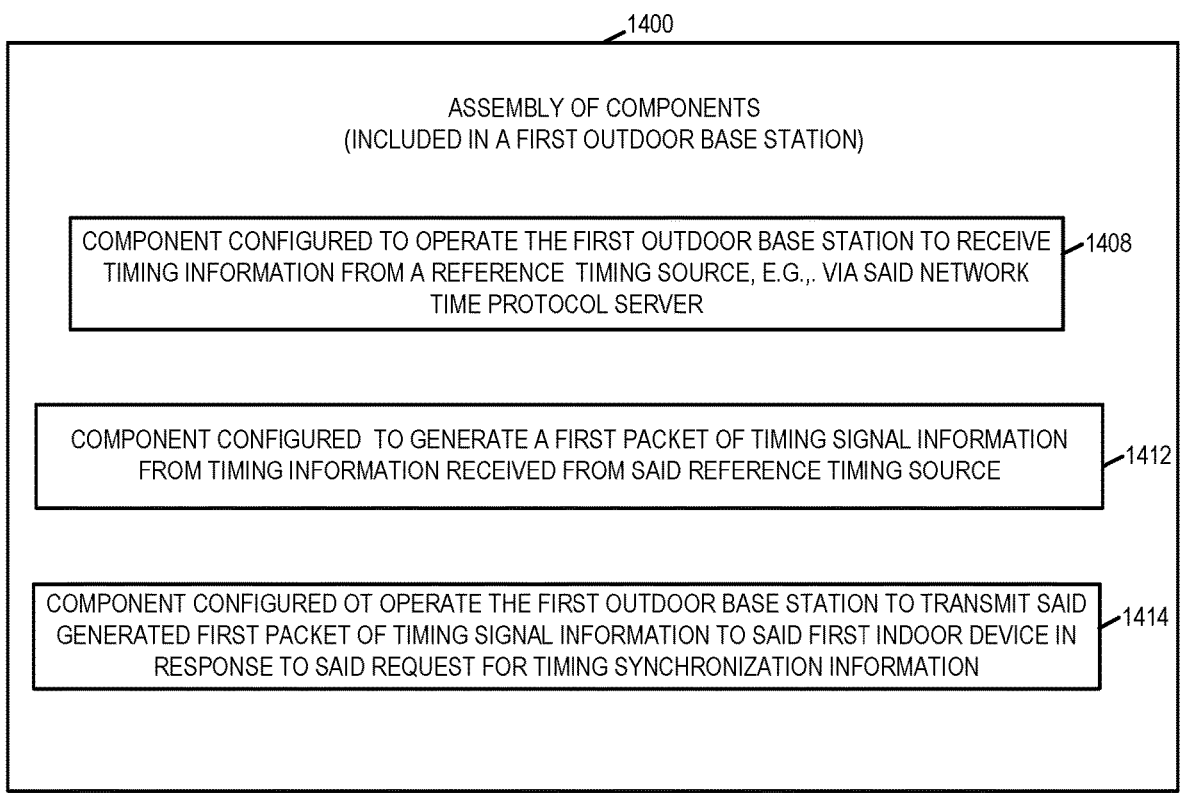
FIG. 14 is a drawing of an exemplary assembly of components, which may be included in an exemplary first outdoor base station, e.g., a first outdoor base station supporting NB-IoT communications, in accordance with an exemplary embodiment.

FIG. 14 is a drawing of an exemplary assembly of components 1400 which may be included in an exemplary first outdoor base station, e.g., a first outdoor base station supporting NB-IoT communications, in accordance with an exemplary embodiment. Assembly of components 1400 can be, and in some embodiments is, used in NB-IoT capable outdoor radio 202, e.g., an outdoor base station supporting NB-IoT, of FIG. 2 or 2A, outdoor cellular IoT eNodeB 424 of FIG. 4, NB-IoT capable outdoor base station 610 of FIG. 6, outdoor NB-IoT device 630 of FIG. 6, outdoor base station 804 of FIG. 8, outdoor NB-IoT device 916 of FIG. 9, a first outdoor base station implementing steps of flowchart 1000 of FIG. 10, outdoor base station 1300 of FIG. 13, e.g., a first outdoor base station such as a cellular eNB or gNB supporting NB-IoT communications, and/or one or more of the outdoor cellular base stations supporting NB-IoT in guard bands (2106, 2108, . . . , 2110) of FIG. 21. The components in the assembly of components 1400 can, and in some embodiments are, implemented fully in hardware within the processor 1302, e.g., as individual circuits. The components in the assembly of components 1400 can, and in some embodiments are, implemented fully in hardware within the assembly of components 1308, e.g., as individual circuits corresponding to the different components. In other embodiments some of the components are implemented, e.g., as circuits, within the processor 1302 with other components being implemented, e.g., as circuits within assembly of components 1308, external to and coupled to the processor 1302. As should be appreciated the level of integration of components on the processor and/or with some components being external to the processor may be one of design choice. Alternatively, rather than being implemented as circuits, all or some of the components may be implemented in software and stored in the memory 1310 of the outdoor base station 1300 with the components controlling operation of the outdoor base station, to implement the functions corresponding to the components when the components are executed by a processor, e.g., processor 1302. In some such embodiments, the assembly of components 1400 is included in the memory 1310 as assembly of components 1330. In still other embodiments, various components in assembly of components 1400 are implemented as a combination of hardware and software, e.g., with another circuit external to the processor 1302 providing input to the processor 1302 which then under software control operates to perform a portion of a component's function. While processor 1302 is shown in the FIG. 13 embodiment as a single processor, e.g., computer, it should be appreciated that the processor 1302 may be implemented as one or more processors, e.g., computers.

When implemented in software the components include code, which when executed by the processor 1302, configure the processor 1302 to implement the function corresponding to the component. In embodiments where the assembly of components 1400 is stored in the memory 1310, the memory 1310 is a computer program product comprising a computer readable medium comprising code, e.g., individual code for each component, for causing at least one computer, e.g., processor 1302, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 14 control and/or configure the outdoor base station 1300, e.g., a first outdoor cellular base station supporting NB-IoT communications, or elements therein such as the processor 1302, to perform the functions of corresponding steps illustrated and/or described in the method of one or more of the flowcharts, signaling diagrams and/or described with respect to any of the Figures. Thus the assembly of components 1400 includes various components that perform functions of corresponding one or more described and/or illustrated steps of an exemplary method, e.g., steps of the method of flowchart 1000 of FIG. 10 and/or described or shown with respect to any of the other figures.

Assembly of components 1400 includes a component 1408 configured to operate the first outdoor base station to receive timing information from a reference timing source, e.g., via a network time protocol (NPT) server, a component 1412 configured to generate a first packet of timing signal information from timing information received from said reference timing source, and a component 1414 configured to operate the first outdoor base station to transmit said generated first packet of timing signal information to said first indoor device in response to said request for timing synchronization information.

Figure 15:
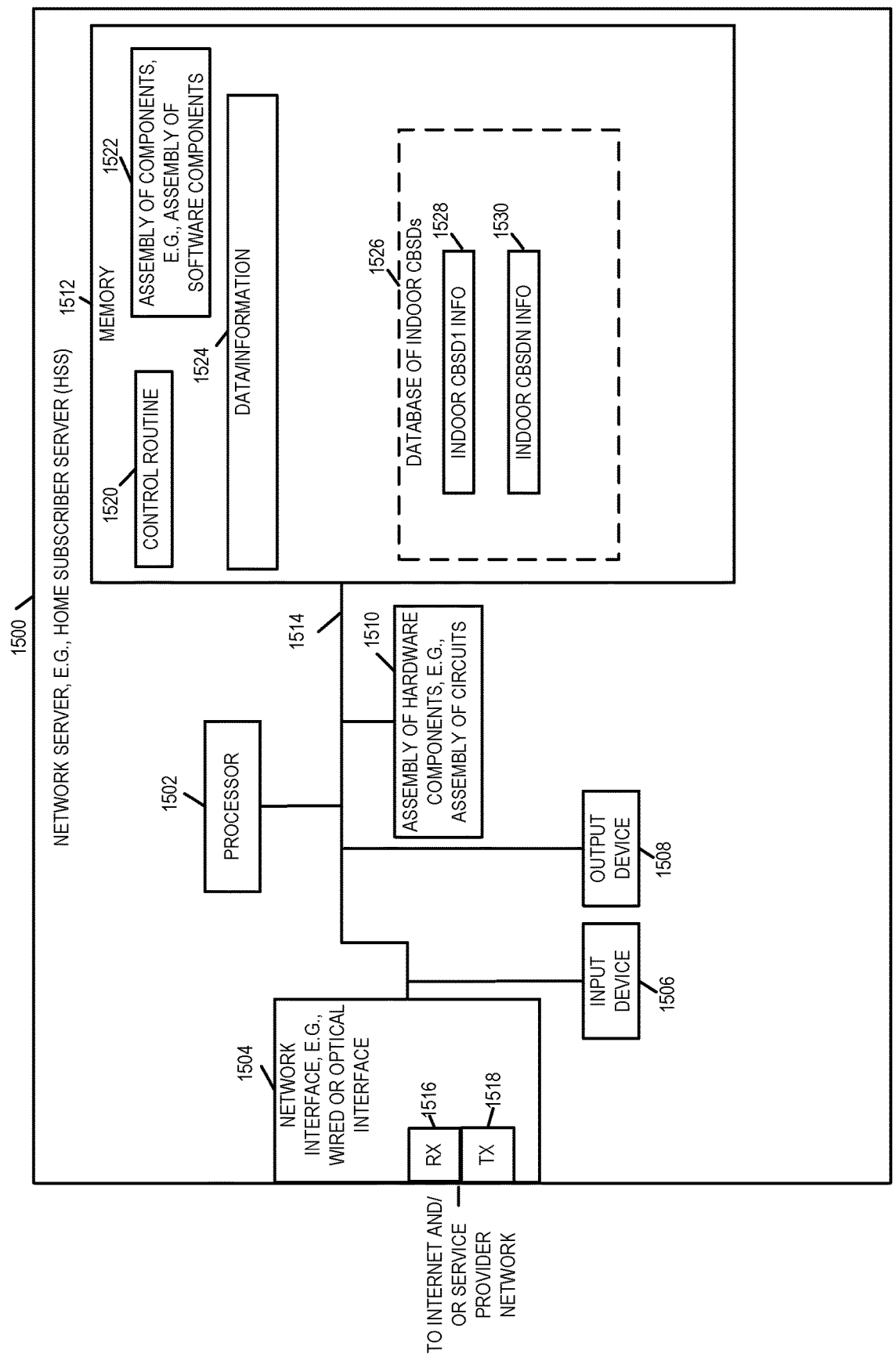
FIG. 15 is a drawing of an exemplary network server, e.g., an exemplary HSS server, in accordance with an exemplary embodiment.

FIG. 15 is a drawing of an exemplary network server 1500, e.g., an exemplary home subscribe server (HSS), in accordance with an exemplary embodiment. Exemplary network server 1500 is, e.g., HSS 414 of FIG. 4, HSS 908 of FIG. 9 and/or a HSS described with respect to flowchart 1000 of FIG. 10.

Exemplary network server 1500 includes a processor 1502, e.g., a CPU, a network interface 1504, e.g., a wired or optical interface, an input device 1506, e.g., a keyboard, an output device 1508, e.g., a display, an assembly of hardware components 1510, e.g., an assembly of circuits, and memory 1512 coupled together via a bus 1514 over which the various elements interchange data and information.

Network interface 1504 includes a receiver 1516 and a transmitter 1518, via which the network server 1500 can communicate, with other communications devices. Memory 1512 includes a control routine 1520, an assembly of components 1522, e.g., an assembly of software components, data/information 1524, and, in some embodiments, a database 1526 of indoor CBSDs. In some embodiments, the database 1526 is located external to network server 1500, and is coupled to the network server 1500.

Figure 16:
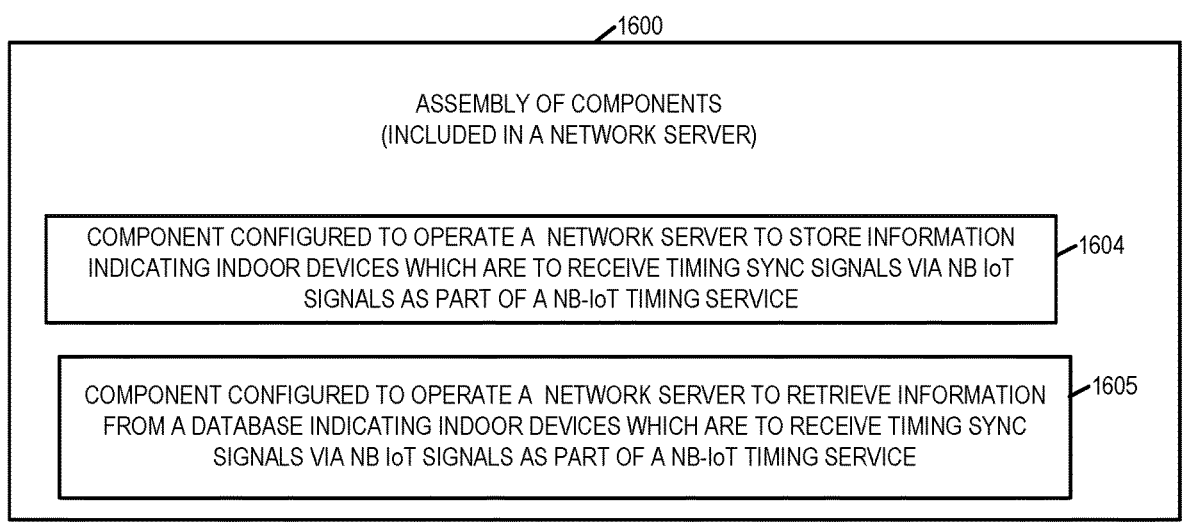
FIG. 16 is a drawing of an exemplary assembly of components, which may be included in an exemplary network server, e.g., an exemplary HSS server, in accordance with an exemplary embodiment.

FIG. 16 is a drawing of an exemplary assembly of components 1600 which may be included in an exemplary network server, e.g., a HSS server, in accordance with an exemplary embodiment. Assembly of components 1600 can be, and in some embodiments is, used in HSS 414 of FIG. 4, HSS 908 of FIG. 9, a network server, e.g. and HSS, implementing steps of flowchart 1000 of FIG. 10, and/or network server 1500, e.g., a HSS, of FIG. 15. The components in the assembly of components 1600 can, and in some embodiments are, implemented fully in hardware within the processor 1502, e.g., as individual circuits. The components in the assembly of components 1600 can, and in some embodiments are, implemented fully in hardware within the assembly of components 1510, e.g., as individual circuits corresponding to the different components. In other embodiments some of the components are implemented, e.g., as circuits, within the processor 1502 with other components being implemented, e.g., as circuits within assembly of components 1510, external to and coupled to the processor 1502. As should be appreciated the level of integration of components on the processor and/or with some components being external to the processor may be one of design choice. Alternatively, rather than being implemented as circuits, all or some of the components may be implemented in software and stored in the memory 1512 of the network serve 1500 with the components controlling operation of the network, to implement the functions corresponding to the components when the components are executed by a processor, e.g., processor 1502. In some such embodiments, the assembly of components 1600 is included in the memory 1512 as assembly of components 1522. In still other embodiments, various components in assembly of components 1522 are implemented as a combination of hardware and software, e.g., with another circuit external to the processor 1502 providing input to the processor 1502 which then under software control operates to perform a portion of a component's function. While processor 1502 is shown in the FIG. 15 embodiment as a single processor, e.g., computer, it should be appreciated that the processor 1502 may be implemented as one or more processors, e.g., computers.

When implemented in software the components include code, which when executed by the processor 1502, configure the processor 1502 to implement the function corresponding to the component. In embodiments where the assembly of components 1600 is stored in the memory 1512, the memory 1512 is a computer program product comprising a computer readable medium comprising code, e.g., individual code for each component, for causing at least one computer, e.g., processor 1502, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 16 control and/or configure the network server 1500, e.g., a HSS, or elements therein such as the processor 1502, to perform the functions of corresponding steps illustrated and/or described in the method of one or more of the flowcharts, signaling diagrams and/or described with respect to any of the Figures. Thus the assembly of components 1600 includes various components that perform functions of corresponding one or more described and/or illustrated steps of an exemplary method, e.g., steps of the method of flowchart 1000 of FIG. 10 and/or described or shown with respect to any of the other figures.

Assembly of components 1600 includes a component 1604 configured to operate the network server to store information indicating indoor devices which are to receive timing synchronization signals via NB-IoT signals as part of a NB-IoT timing service and a component 1606 configured to operate the network serve to retrieve information from a database indicating indoor devices which are to receive timing synch signals via NB-IoT signals as part of a NB-IoT timing service.

Figure 17:
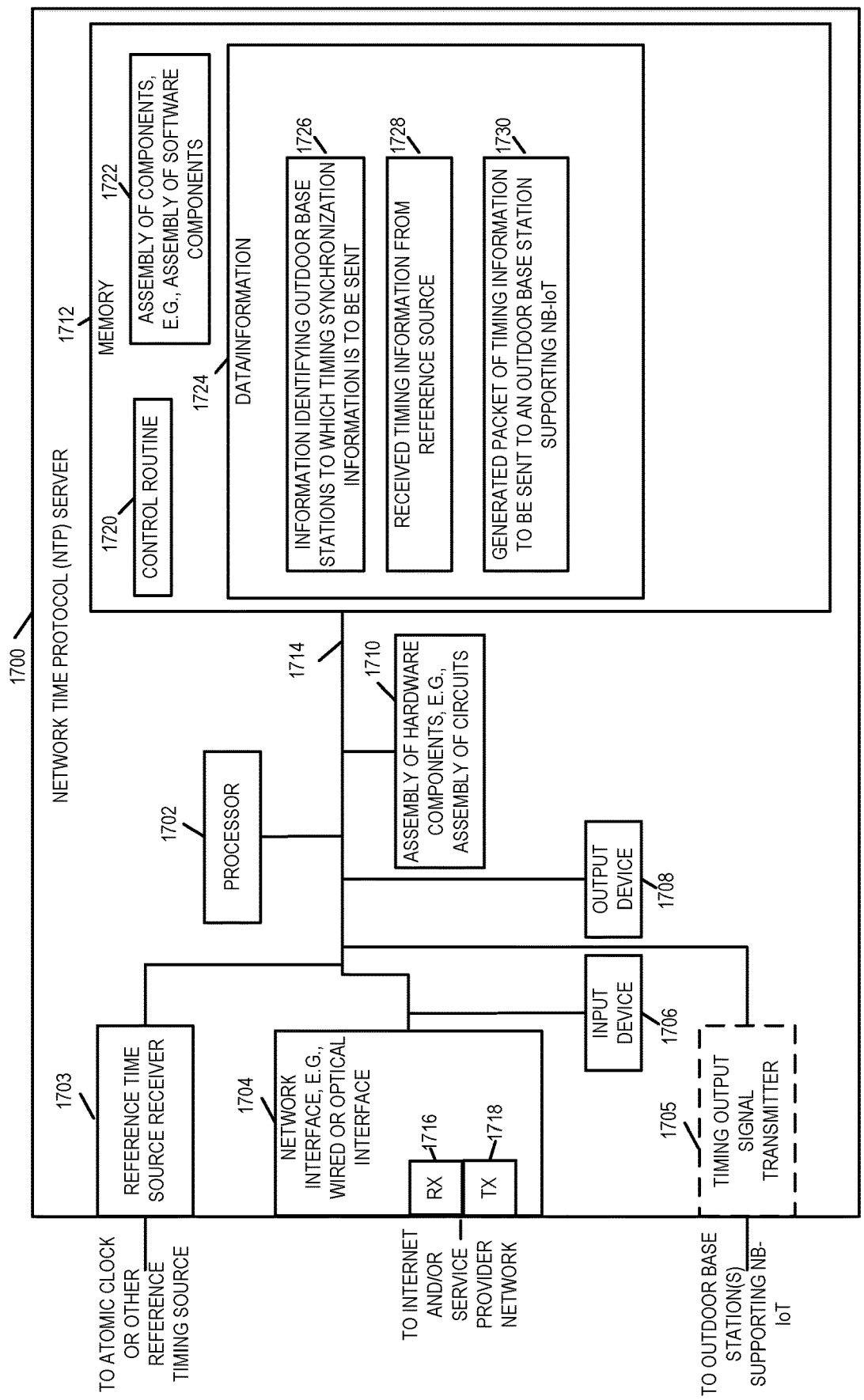
FIG. 17 is a drawing of an exemplary network time protocol (NPT) server in accordance with an exemplary embodiment.

FIG. 17 is a drawing of an exemplary network time protocol (NPT) server 1700 in accordance with an exemplary embodiment. Exemplary NPT server 1700 is, e.g., NPT server 404 of FIG. 4, NPT server 504 of FIG. 5, NPT server 904 of FIG. 9 and/or a NPT server described with respect to flowchart 1000 of FIG. 10.

Exemplary NPT server 1700 includes a processor 1702, e.g., a CPU, a reference time source receiver 1703, e.g., coupled to an atomic clock or other timing reference source, a network interface 1704, e.g., a wired or optical interface, an input device 1706, e.g., a keyboard, an output device 1708, e.g., a display, an assembly of hardware components 1710, e.g., an assembly of circuits, memory 1712, and in some embodiments, a timing output signal transmitter 1705, coupled together via a bus 1714 over which the various elements interchange data and information. In some embodiments, including timing output signal transmitter 1705, the timing output signal transmitted to coupled to one or more outdoor base stations supporting NB-IoT communications and is used to communicate timing synchronization information, e.g. via a direct link or via a stable service provider network path with a stable path delay time.

Network interface 1704 includes a receiver 1716 and a transmitter 1718, via which the NTP server 1700 can communicate, with other communications devices. In some embodiments timing synchronization information is communicated to outdoor base stations supporting NB-IoT communications via transmitter 1718 of network interface 1704, e.g., with the signal traversing the Internet and/or a service provider network. Memory 1712 includes a control routine 1720, an assembly of components 1722, e.g., an assembly of software components, and data/information 1724.

Figure 18:
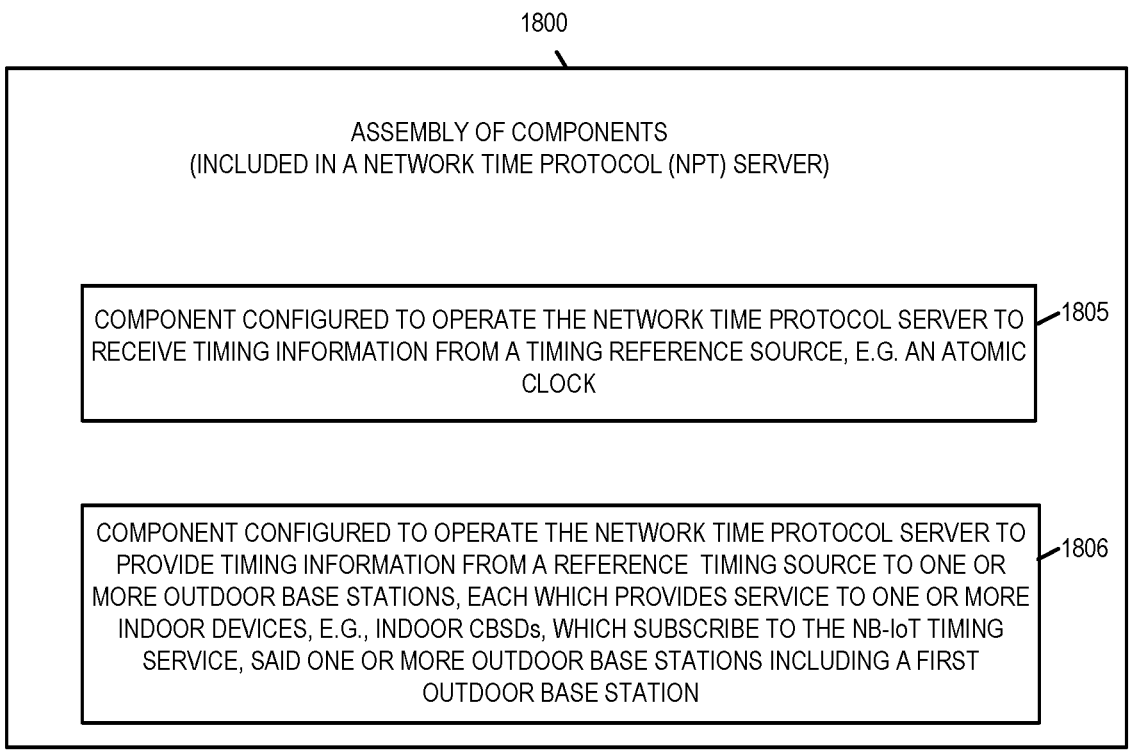
FIG. 18 is a drawing of an exemplary assembly of components, which may be included in an exemplary network time protocol (NPT) server in accordance with an exemplary embodiment.

FIG. 18 is a drawing of an exemplary assembly of components 1800 which may be included in an exemplary NPT server in accordance with an exemplary embodiment. Assembly of components 1800 can be, and in some embodiments is, used in NPT server 404 of FIG. 4, NPT server 904 of FIG. 9, a NPT server implementing steps of flowchart 1000 of FIG. 10, and/or NPT server 1700 of FIG. 17. The components in the assembly of components 1800 can, and in some embodiments are, implemented fully in hardware within the processor 1702, e.g., as individual circuits. The components in the assembly of components 1800 can, and in some embodiments are, implemented fully in hardware within the assembly of components 1710, e.g., as individual circuits corresponding to the different components. In other embodiments some of the components are implemented, e.g., as circuits, within the processor 1702 with other components being implemented, e.g., as circuits within assembly of components 1710, external to and coupled to the processor 1702. As should be appreciated the level of integration of components on the processor and/or with some components being external to the processor may be one of design choice. Alternatively, rather than being implemented as circuits, all or some of the components may be implemented in software and stored in the memory 1712 of the NPT server 1700 with the components controlling operation of the network, to implement the functions corresponding to the components when the components are executed by a processor, e.g., processor 1702. In some such embodiments, the assembly of components 1800 is included in the memory 1712 as assembly of components 1722. In still other embodiments, various components in assembly of components 1722 are implemented as a combination of hardware and software, e.g., with another circuit external to the processor 1702 providing input to the processor 1702 which then under software control operates to perform a portion of a component's function. While processor 1702 is shown in the FIG. 17 embodiment as a single processor, e.g., computer, it should be appreciated that the processor 1702 may be implemented as one or more processors, e.g., computers.

When implemented in software the components include code, which when executed by the processor 1702, configure the processor 1702 to implement the function corresponding to the component. In embodiments where the assembly of components 1800 is stored in the memory 1712, the memory 1712 is a computer program product comprising a computer readable medium comprising code, e.g., individual code for each component, for causing at least one computer, e.g., processor 1702, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 18 control and/or configure the NPT server 1700 or elements therein such as the processor 1702, to perform the functions of corresponding steps illustrated and/or described in the method of one or more of the flowcharts, signaling diagrams and/or described with respect to any of the Figures. Thus the assembly of components 1800 includes various components that perform functions of corresponding one or more described and/or illustrated steps of an exemplary method, e.g., steps of the method of flowchart 1000 of FIG. 10 and/or described or shown with respect to any of the other figures.

Assembly of components 1800 includes a component 1805 configured to operate the network time protocol server to receive timing information from a timing reference source, e.g., an atomic clock and a component 1806 configured to operate the network time protocol server to provide timing information from a reference source to one or more outdoor base stations, each which provides service to one or more indoor devices, e.g. indoor CBSDs, which subscribe to the NB-IoT timing service, said one or more outdoor base stations includes a first outdoor base station.

Figure 19:
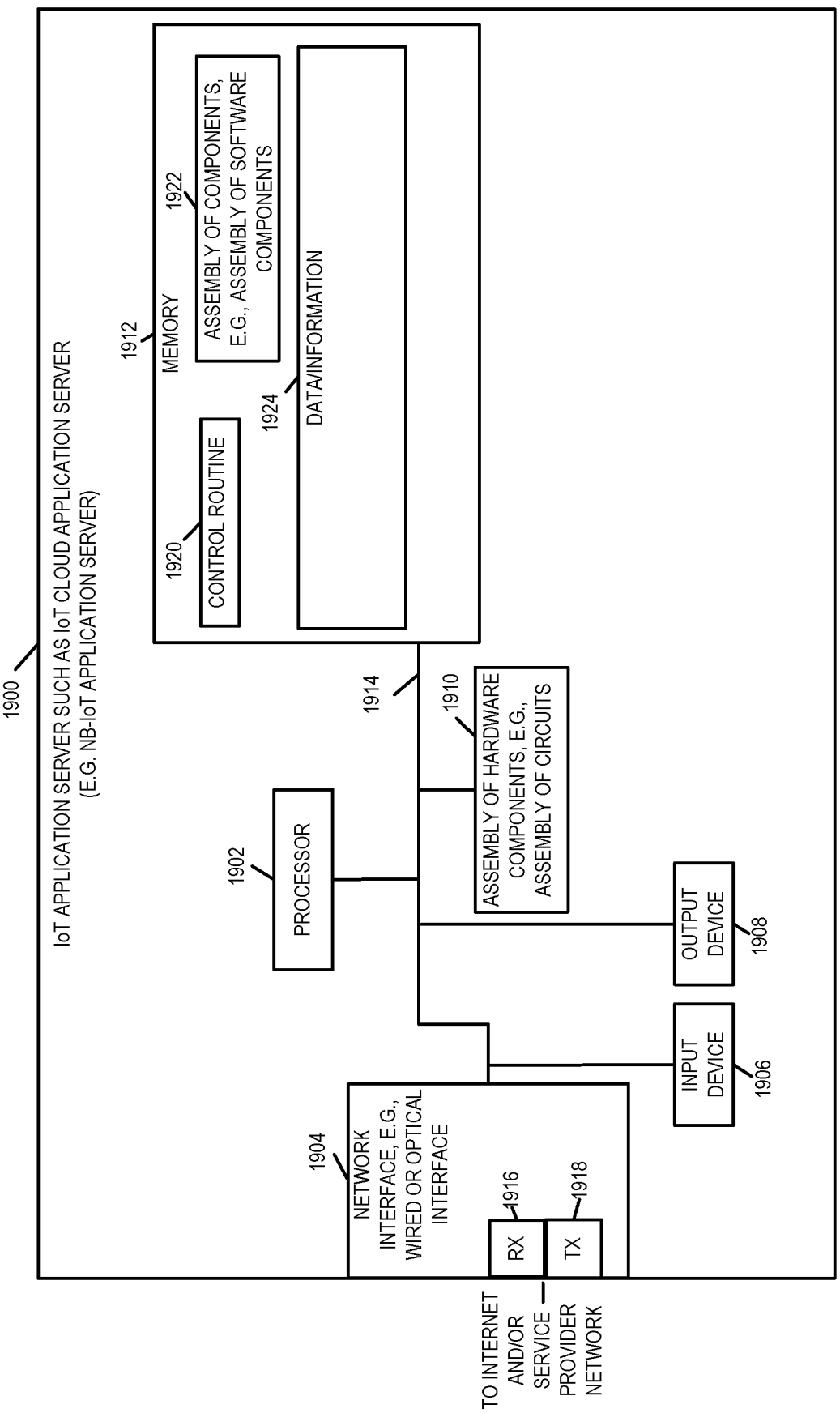
FIG. 19 is a drawing of an exemplary IoT application server, e.g., a IoT cloud application server, in accordance with an exemplary embodiment.

FIG. 19 is a drawing of an exemplary IoT application server 1900, e.g., an IoT cloud application server, in accordance with an exemplary embodiment. In some embodiments, IoT application server 1900 is a NB-IoT application server. Exemplary IoT application server 1900 is, e.g., IoT cloud application server 406 of FIG. 4, IoT cloud application server 912 of FIG. 9 and/or an IoT application server described with respect to flowchart 1000 of FIG. 10 or any or the other Figures.

Exemplary IoT application server 1900 includes a processor 1902, e.g., a CPU, a network interface 1904, e.g., a wired or optical interface, an input device 1906, e.g., a keyboard, an output device 1908, e.g., a display, an assembly of hardware components 1910, e.g., an assembly of circuits, and memory 1912, coupled together via a bus 1914 over which the various elements interchange data and information. Network interface 1904 includes a receiver 1916 and a transmitter 1918, via which the IoT application server 1900 can communicate, with other communications devices.

Figure 20:
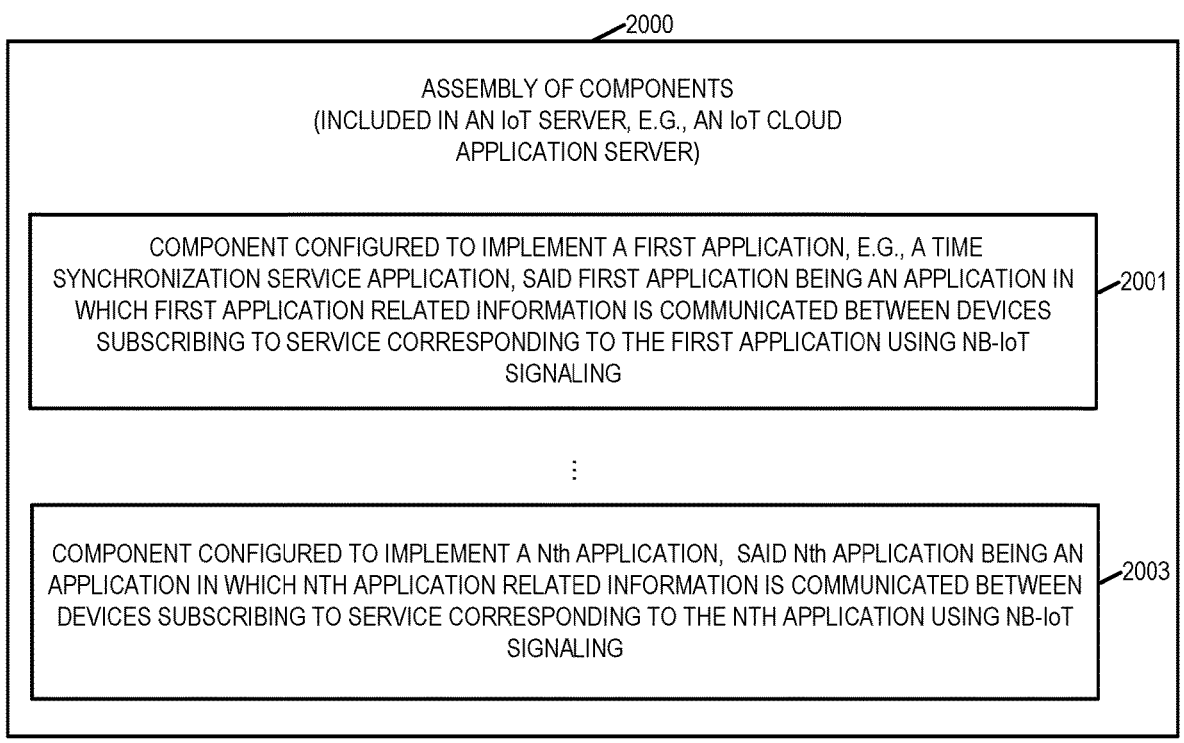
FIG. 20 is a drawing of an exemplary assembly of components, which may be included in an exemplary IoT application server, e.g., a IoT cloud application server, in accordance with an exemplary embodiment.

FIG. 20 is a drawing of an exemplary assembly of components 2000 which may be included in an exemplary IoT application server, e.g., a NB-IoT application server, in accordance with an exemplary embodiment. In some embodiments, the IoT application server is an IoT cloud application server. Assembly of components 2000 can be, and in some embodiments is, used in IoT cloud application server 406 of FIG. 4, IoT cloud application server 912 of FIG. 9, an IoT application server implementing steps of flowchart 1000 of FIG. 10, and/or an IoT application server 1900 of FIG. 19. The components in the assembly of components 2000 can, and in some embodiments are, implemented fully in hardware within the processor 1902, e.g., as individual circuits. The components in the assembly of components 2000 can, and in some embodiments are, implemented fully in hardware within the assembly of components 1910, e.g., as individual circuits corresponding to the different components. In other embodiments some of the components are implemented, e.g., as circuits, within the processor 1902 with other components being implemented, e.g., as circuits within assembly of components 1910, external to and coupled to the processor 1902. As should be appreciated the level of integration of components on the processor and/or with some components being external to the processor may be one of design choice. Alternatively, rather than being implemented as circuits, all or some of the components may be implemented in software and stored in the memory 1912 of the IoT application server 1900 with the components controlling operation of the network, to implement the functions corresponding to the components when the components are executed by a processor, e.g., processor 1902. In some such embodiments, the assembly of components 2000 is included in the memory 1912 as assembly of components 1922. In still other embodiments, various components in assembly of components 2000 are implemented as a combination of hardware and software, e.g., with another circuit external to the processor 1902 providing input to the processor 1902 which then under software control operates to perform a portion of a component's function. While processor 1902 is shown in the FIG. 19 embodiment as a single processor, e.g., computer, it should be appreciated that the processor 1902 may be implemented as one or more processors, e.g., computers.

When implemented in software the components include code, which when executed by the processor 1902, configure the processor 1902 to implement the function corresponding to the component. In embodiments where the assembly of components 2000 is stored in the memory 1912, the memory 1912 is a computer program product comprising a computer readable medium comprising code, e.g., individual code for each component, for causing at least one computer, e.g., processor 1902, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 19 control and/or configure the IoT application server 1900 or elements therein such as the processor 1902, to perform the functions of corresponding steps illustrated and/or described in the method of one or more of the flowcharts, signaling diagrams and/or described with respect to any of the Figures. Thus the assembly of components 2000 includes various components that perform functions of corresponding one or more described and/or illustrated steps of an exemplary method, e.g., steps of the method of flowchart 1000 of FIG. 10 and/or described or shown with respect to any of the other figures.

Assembly of components 2000 includes a component 2001 configured to implement a first application, e.g., a time synchronization service application, said first application being an application in which first application related information is communicated between devices subscribing to service corresponding to the first application using NB-IoT signaling. Assembly of components 2000 further includes a component 2003 configured to implement a Nth application, said Nth application being an application in which Nth application related information is communicated between devices subscribing to service corresponding to the Nth application using NB-IoT signaling.

FIG. 21 is a drawing 2100 illustrating the distribution of timing synchronization information in an exemplary communications system in accordance with an exemplary embodiment. The exemplary communications system includes an atomic clock 2102, a network time protocol (NPT) server 2104, a plurality of outdoor cellular base stations supporting NB-IoT in guard bands (outdoor cellular base station 1 supporting NB-IoT in guard bands 2106, outdoor cellular base station 2 supporting NB-IoT in guard bands 2108, . . . , outdoor cellular base station N supporting NB-IoT in guard bands 2110). The exemplary communications system further includes a plurality of sets of indoor CBSDs supporting NB-IoT signaling including set of building 1 indoor CBSDs supporting NB-IoT signaling 2112, set of building 2 indoor CBSDs supporting NB-IoT signaling 2114, set of building 3 indoor CBSDs supporting NB-IoT signaling 2116, set of building 4 indoor CBSDs supporting NB-IoT signaling 2118, set of building 5 indoor CBSDs supporting NB-IoT signaling 2120, and set of building M indoor CBSDs supporting NB-IoT signaling 2122.

NPT server receives reference timing information signals 2124 from atomic clock 2102. The NTP server 2104 sends timing synchronization information signals (2126, 2128, . . . , 2130) to each of the outdoor cellular base stations (2106, 2108, . . . , 2110), respectively.

Outdoor cellular base station 12106 sends timing synchronization information, via NB-IoT signals, to one or more CBSDs in the set of building 1 indoor CBSDs 2112 as indicated by dotted lines arrows (2132, . . . , 2134). Outdoor cellular base station 12106 sends timing synchronization information, via NB-IoT signals, to one or more CBSDs in the set of building 2 indoor CBSDs 2114 as indicated by dotted lines arrows (2136, . . . , 2138).

Outdoor cellular base station 2 2108 sends timing synchronization information, via NB-IoT signals, to one or more CBSDs in the set of building 3 indoor CBSDs 2116 as indicated by dotted lines arrows (2140, . . . , 2142). Outdoor cellular base station 2 2108 sends timing synchronization information, via NB-IoT signals, to one or more CBSDs in the set of building 4 indoor CBSDs 2114 as indicated by dotted lines arrows (2144, . . . , 2146).

Outdoor cellular base station N 2110 sends timing synchronization information, via NB-IoT signals, to one or more CBSDs in the set of building 5 indoor CBSDs 2122 as indicated by dotted lines arrows (2148, . . . , 2150). Outdoor cellular base station N 2110 sends timing synchronization information, via NB-IoT signals, to one or more CBSDs in the set of building M indoor CBSDs 2120 as indicated by dotted lines arrows (2152, . . . , 2154).

In accordance with a feature of various embodiments, the same atomic clock 2102 and same NPT server 2104, e.g., which are relatively expensive devices, are used as a source of timing synchronization information for a plurality of outdoor base stations (2106, 2108, . . . 2110), and each of the outdoor base stations (2106, 2108, . . . , 2110) provides, e.g., distributes, timing synchronization information to one or more indoor CBSD devices, via NB-IoT signaling. Some of the indoor CBSDs may not be able to receive and recover a NB-IoT signal from the outdoor base station in its vicinity, and those CBSDs receive timing synchronization information from one of the CBSDs in the same building which was able to directly receive NB-IoT signals from the outdoor base station. The techniques of various embodiments may be implemented using software, hardware and/or a combination of software and hardware.

Numbered List of Exemplary Method Embodiments

Method Embodiment 1 A method of communicating timing information, the method comprising: operating (1016) a first indoor device with a NB-IoT receiver to receive a NB-IoT signal transmitted by an first outdoor base station and to recover timing information from said received NB-IoT signal; and operating (1022) the first indoor device to communicate timing information recovered from said received NB-IoT signal to a second indoor device.

Method Embodiment 2 The method of Method Embodiment 1, wherein said first outdoor base station is an eNB with a NB-IoT transmitter.

Method Embodiment 3 The method of Method Embodiment 1, wherein said first outdoor base station is an gNB with a NB-IoT transmitter.

Method Embodiment 4 The method of Method Embodiment 1, wherein said first outdoor base station is a cellular base station.

Method Embodiment 5 The method of Method Embodiment 4, wherein said first outdoor base station has a channel bandwidth including a primary transmission bandwidth and two guard bands, and wherein said received NB-IoT signal was communicated in a first one of the two guard bands.

Method Embodiment 6 The method of Method Embodiment 1, wherein said first outdoor base station is a CBSD category B base station.

Method Embodiment 7 The method of Method Embodiment 1, wherein said first indoor base station is a CBSD category A base station.

Method Embodiment 8 The method of Method Embodiment 1, wherein recovering (1016) timing information includes recovering (1018) a first packet of timing synchronization information, said first packet of timing information including an original reference time stamp indicating a time indicated by a reference timing source which provided timing information to said outdoor base station.

Method Embodiment 9 The method of Method Embodiment 8 wherein said first packet of timing synchronization further includes a first stratum indicating the level of proximity (e.g., primary, secondary, etc.,) to the reference timing source.

Method Embodiment 10 The method of Method Embodiment 9, wherein said first timing packet further includes a first path loss delay offset and a synch counter.

Method Embodiment 11 The method of Method Embodiment 10, wherein said first path loss delay offset is obtained from channel state information (CSI) which helps in estimating pathloss and estimating time delay to reach a device.

Method Embodiment 12 The method of Method Embodiment 10, wherein said synch counter is decremented each time this information is received from another CBSD. (For example, a peer to peer establishment of connectivity to share synch information between the primary recipient of the synch information, e.g., a first CBSD, will decrement sync counter before forwarding it to the secondary CBSD, i.e. CBSD 2, and so on so forth. The purpose of doing this is to limit the number of hops as the time sensitive information may actually become inaccurate do to unexpected path loss delays.)

Method Embodiment 13 The method of Method Embodiment 8, wherein said first timing packet further includes precision information indicating precision of the local clock (e.g., in power of 2).

Method Embodiment 14 The method of Method Embodiment 8, wherein said first timing packet further includes a status indicator indicating clock synchronized or not synchronized.

Method Embodiment 15 The method of Method Embodiment 8, wherein said first timing packet further includes a root delay indicating a round trip delay to the primary source.

Method Embodiment 16 The method of Method Embodiment 10, wherein said first timing packet further includes a reference time stamp indicating a reference time stamp value, frequency information indicating oscillator pulse frequency and phase information indicating oscillator pulse phase.

Method Embodiment 17 The method of Method Embodiment 1, wherein operating (1022) the first indoor device to communicate timing information recovered from said NB-IoT signal to a second indoor device includes: operating (1024) the first indoor device to generate a second packet of timing synchronization information from timing information recovered from said first packet of timing synchronization information; and operating (1032) the first indoor device to transmit the second packet of timing synchronization information to the second indoor device.

Method Embodiment 18 The method of Method Embodiment 1, wherein generating (1024) the second packet of timing synchronization information includes: incrementing (1026) stratum information to reflect that the second packet of timing synchronization is being transmitted by a device which is further away from said reference timing source than said first outdoor base station.

Method Embodiment 19 The method of Method Embodiment 18, wherein generating (1024) the second packet of timing synchronization information further includes: including (1028) a second path loss delay offset value in said second packet of timing information, said second path loss delay offset value being larger than a first path loss delay offset value included in said first packet of timing synchronization information.

Method Embodiment 20 The method of Method Embodiment 19, wherein generating (1024) the second packet of timing synchronization information further includes: including (1030) a reference time stamp generated by said first indoor device in said second packet of timing synchronization information and an original time stamp obtained from said first packet of timing synchronization information.

Method Embodiment 21 The method of Method Embodiment 17, wherein transmitting (1032) the second packet of timing synchronization information to the second indoor device includes transmitting (1034) the second packet over a wired network interface to said second indoor device.

Method Embodiment 22 The method of Method Embodiment 21, wherein said second indoor device is located on a different floor of a building than said first indoor device, said first and second indoor devices being located in the same building.

Method Embodiment 23 The method of Method Embodiment 17, wherein transmitting (1032) the second packet of timing synchronization information to the second indoor device includes transmitting (1036) the second packet over a wireless link as a second wireless signal.

Method Embodiment 24 The method claim 23, wherein said second wireless signal is a second NB IoT signal.

Method Embodiment 25 The method of Method Embodiment 23, wherein said second indoor device is located in the same building as said first indoor device (e.g., on the same floor or an adjacent floor of the same building in which the first indoor device is located) and within wireless signal range of the first indoor device but outside of NB IoT signal range of said first outdoor base station.

Method Embodiment 26 The method of Method Embodiment 25, wherein the second indoor device is a CBSD.

Method Embodiment 27 The method of Method Embodiment 26, wherein said second indoor device is a CBSD category A base station.

Method Embodiment 28 The method of Method Embodiment 25, further comprising: operating (1010) the first indoor device to send a synchronization request signal to the first outdoor base station via a wireless NB IoT signal transmitted by the first indoor device; and wherein said first packet of timing synchronization information is received from the outdoor base station in response to said synchronization request signal.

Method Embodiment 29 The method of Method Embodiment 28, further comprising: storing (1004) in a network server or a database coupled to said network server information indicating indoor devices which are to receive timing synchronization signals via NB-IoT signals as part of a NB-IoT timing service; and operating (1006) a network time protocol (NPT) server to provide timing information from said timing reference source to one or more outdoor base stations which provide service to one or more indoor devices (e.g., CBSDs) which subscribe to a NB-IoT timing service, said one or more outdoor base stations including said first outdoor base station.

Method Embodiment 30 The method of Method Embodiment 28, further comprising: operating (1008) the first outdoor base station to receive timing information from said reference timing source (e.g., via said network time protocol (NPT) server); operating (1012) the first outdoor base station to generate said first packet of timing signal information from timing information received from said reference time source; and operating (1014) the first outdoor base station to transmit said first packet of timing signal information to said first indoor base station in response to said request for timing synchronization information.

Numbered List of Exemplary System Embodiments

System Embodiment 1 A communications system (900) comprising: a first indoor device (924 or 1100) including: a first NB-IoT receiver (1124); and a first processor (1102); and wherein said first processor (1102) is configured to: operate (1016) the first indoor device (924 or 1100) with the first NB-IoT receiver (1124) to receive a NB-IoT signal transmitted by a first outdoor base station (916 or 1300) and to recover timing information from said received NB-IoT signal; and operate (1022) the first indoor device (924 or 1100) to communicate timing information recovered from said received NB-IoT signal to a second indoor device (928).

System Embodiment 2 The communications system (900) of System Embodiment 1, wherein said first outdoor base station (916 or 1300) is an eNB with a NB-IoT transmitter (1326).

System Embodiment 3 The communications system (900) of System Embodiment 1, wherein said first outdoor base station (916 or 1300) is an gNB with a NB-IoT transmitter (1326).

System Embodiment 4 The communications system (900) of System Embodiment 1, wherein said first outdoor base station (916 or 1300) is a cellular base station.

System Embodiment 5 The communications system (900) of System Embodiment 4, wherein said first outdoor base station (916 or 1300) has a channel bandwidth (306) including a primary transmission bandwidth (310) and two guard bands (308, 312), and wherein said received NB-IoT signal was communicated in a first one (308 or 312) of the two guard bands (308,312).

System Embodiment 6 The communications system (900) of System Embodiment 1, wherein said first outdoor base station (916 or 1300) is a CBSD category B base station.

System Embodiment 7 The communications system (900) of System Embodiment 1, wherein said first indoor base station (924 or 1100) is a CBSD category A base station.

System Embodiment 8 The communications system (900) of System Embodiment 1, wherein said first processor (1102) is configured to: operate the first indoor device (924 or 1100) to recover (1018) a first packet of timing synchronization information, as part of being configured to operate the first indoor device (924 or 1100) to recover (1016) timing information, said first packet of timing information including an original reference time stamp (716) indicating a time indicated by a reference timing source which provided timing information to said outdoor base station (916 or 1300).

System Embodiment 9 The communications system (900) of System Embodiment 8 wherein said first packet of timing synchronization further includes a first stratum (704) indicating the level of proximity (e.g., primary, secondary, etc.,) to the reference timing source.

System Embodiment 10 The communications system (900) of System Embodiment 9, wherein said first timing packet further includes a first path loss delay offset (722) and a synch counter (724).

System Embodiment 11 The communications system (900) of System Embodiment 10, wherein said first path loss delay offset (722) is obtained from channel state information (CSI) which helps in estimating pathloss and estimating time delay to reach a device.

System Embodiment 12 The communications system (900) of System Embodiment 10, wherein said synch counter (724) is decremented each time this information is received from another CBSD. (For example, a peer to peer establishment of connectivity to share synch information between the primary recipient of the synch information, e.g., a first CBSD, will decrement sync counter before forwarding it to the secondary CBSD, i.e. CBSD 2, and so on so forth. The purpose of doing this is to limit the number of hops as the time sensitive information may actually become inaccurate do to unexpected path loss delays.)

System Embodiment 13 The communications system (900) of System Embodiment 8, wherein said first timing packet further includes precision information (710) indicating precision of the local clock (e.g., in power of 2).

System Embodiment 14 The communications system (900) of System Embodiment 8, wherein said first timing packet further includes a status indicator (706) indicating clock synchronized or not synchronized.

System Embodiment 15 The communications system (900) of System Embodiment 8, wherein said first timing packet further includes a root delay (712) indicating a round trip delay to the primary source.

System Embodiment 16 The communications system (900) of System Embodiment 10, wherein said first timing packet further includes a reference time stamp (714) indicating a reference time stamp value, frequency information (718) indicating oscillator pulse frequency and phase information (720) indicating oscillator pulse phase.

System Embodiment 17 The communications system (900) of System Embodiment 1, wherein said first processor (1102) is configured to: generate (1024) a second packet of timing synchronization information from timing information recovered from said first packet of timing synchronization information; and operate (1032) the first indoor device (924 or 1100) to transmit the second packet of timing synchronization information to the second indoor device (928), as part of being configured to operate (1022) the first indoor device (924 or 1100) to communicate timing information recovered from said NB-IoT signal to a second indoor device (928).

System Embodiment 18 The communications system (900) of System Embodiment 1, wherein said first processor (1102) is configured to: increment (1026) the stratum information (704) to reflect that the second packet of timing synchronization is being transmitted by a device which is further away from said reference timing source than said first outdoor base station (916 or 1300), as part of being configured to generate (1024) the second packet of timing synchronization information.

System Embodiment 19 The communications system (900) of System Embodiment 18, wherein said first processor (1102) is configured to: include (1028) a second path loss delay offset value in said second packet of timing information, said second path loss delay offset value being larger than the first path loss delay offset value, as part of being configured to generate (1024) the second packet of timing synchronization information.

System Embodiment 20 The communications system of System Embodiment 19, wherein said first processor (1102) is configured to: include (1030) a reference time stamp (714) generated by said first indoor device (924 or 1100) in said second packet of timing synchronization information and an original time stamp (716) obtained from said first packet of timing synchronization information, as part of being configured to generate (1024) the second packet of timing synchronization information.

System Embodiment 21 The communications system (900) of System Embodiment 17, wherein said first processor (1102) is configured to: operate the first indoor device (924 or 1100) to transmit (1034) the second packet over a wired network interface (1106) to said second indoor device (928), as part of being configured to operate the first indoor device (924 or 1100) to transmit (1032) the second packet of timing synchronization information to the second indoor device (928).

System Embodiment 22 The communications system (900) of System Embodiment 21, wherein said second indoor device (928) is located on a different floor of a building (920) than said first indoor device (924 or 1100), said first and second indoor devices being located in the same building (920).

System Embodiment 23 The communications system (900) of System Embodiment 17, wherein said first processor (1102) is configured to operate the first indoor device (924 or 1100) to transmit (1036) the second packet over a wireless link as a second wireless signal, as part of being configured to operate the first indoor device (924 or 1100) to transmit (1032) the second packet of timing synchronization information to the second indoor device (928).

System Embodiment 24 The communications system (900) System Embodiment 23, wherein said second wireless signal is a second NB IoT signal.

System Embodiment 25 The communications system (900) of System Embodiment 23, wherein said second indoor device (928) is located in the same building (920) as said first indoor device (924 or 1100) (e.g., on the same floor or an adjacent floor of the same building in which the first indoor device is located) and within wireless signal range of the first indoor device (924 or 1100) but outside of NB IoT signal range of said first outdoor base station (916 or 1300).

System Embodiment 26 The communications system (900) of System Embodiment 25, wherein the second indoor device (928) is a CBSD.

System Embodiment 27 The communications system (900) of System Embodiment 26, wherein said second indoor device (928) is a CBSD category A base station.

System Embodiment 28 The communications system (900) of System Embodiment 25, wherein said first processor (1102) is further configured to: operate (1010) the first indoor device (924 or 1100) to send a synchronization request signal to the first outdoor base station (916 or 1300) via a wireless NB IoT signal transmitted by the first indoor device (924 or 1100); and wherein said first packet of timing synchronization information is received from the outdoor base station (916 or 1300) in response to said synchronization request signal.

System Embodiment 29 The communications system (900) of System Embodiment 28, further comprising: a network server (908 or 1500) including a second processor (1502); and wherein said second processor (1502) is configured to: operate the network server (908 or 1500) to: store in the network server (908 or 1500) information indicating indoor devices which are to receive timing synchronization signals via NBIoT signals as part of a NB-IoT timing service or operate the network server (908 or 1500) to: retrieve from a database (910) information indicating indoor devices which are to receive timing synchronization signals via NBIoT signals as part of a NB-IoT timing service; and a network time protocol (NPT) server (904 or 1700) including a third processor (1702); and wherein said third processor (1702) is configured to: operate (1006) the network time protocol (NPT) server (904 or 1700) to provide timing information from said timing reference source (902) to one or more outdoor base stations (916 or 1300) which provide service to one or more indoor devices (e.g., CBSDs) (924, 926) which subscribe to a NB-IoT timing service, said one or more outdoor base stations (916 or 1300) including said first outdoor base station (916 or 1300).

System Embodiment 30 The communications system (900) of System Embodiment 28, further comprising: said first outdoor base station (916 or 1300) including a second processor (1302); and wherein said second processor (1302) is configured to: operate (1008) the first outdoor base station (916 or 1300) to receive timing information from said reference timing source (902) (e.g., via said network time protocol (NPT) server (904 or 1700)); generate (1012) said first packet of timing signal information from timing information received from said reference time source; and operate (1014) the first outdoor base station (916 or 1300) to transmit said first packet of timing signal information to said first indoor base station (924 or 1100) in response to said request for timing synchronization information.

Numbered List of Exemplary

Computer Readable Medium Embodiments

Non-Transitory computer readable medium Embodiment 1 A non-transitory computer readable medium (1100) including computer executable instructions which when executed by a processor (1102) of a first indoor device (1100), e.g., a CBSD with a NB-IoT receiver (1124), cause the first indoor device to perform the steps of: operating (1016) the first indoor device to receive a NB-IoT signal transmitted by an first outdoor base station and to recover timing information from said received NB-IoT signal; and operating (1022) the first indoor device to communicate timing information recovered from said received NB-IoT signal to a second indoor device.

Non-Transitory computer readable medium Embodiment 2 A non-transitory computer readable medium (1512) including computer executable instructions which when executed by a processor (1502) of a network server (1500) cause the network server to perform the steps of: storing (1004) in the network server or a database coupled to said network server information indicating indoor devices which are to receive timing synchronization signals via NBIoT signals as part of a NB-IoT timing service.

Non-Transitory computer readable medium Embodiment 3 A non-transitory computer readable medium (1712) including computer executable instructions which when executed by a processor (1702) of a network time protocol (NPT) server (1700) cause the NPT server (1700) to perform the steps of: operating (1006) the network time protocol (NPT) server to provide timing information from a timing reference source to one or more outdoor base stations which provide service to one or more indoor devices (e.g., CBSDs) which subscribe to a NB-IoT timing service, said one or more outdoor base stations including a first outdoor base station.

Non-Transitory computer readable medium Embodiment 4 A non-transitory computer readable medium (1310) including computer executable instructions which when executed by a processor (1302) of a first outdoor base station (1300), e.g. a cellular eNB supporting NB-IoT signaling, cause the first outdoor base station (1300) to perform the steps of: operating (1008) the first outdoor base station to receive timing information from a reference timing source (e.g., via said network time protocol (NPT) server); operating (1012) the first outdoor base station to generate a first packet of timing signal information from timing information received from said reference time source; and operating (1014) the first outdoor base station to transmit (e.g., via NB-IoT signals) said first packet of timing signal information to said first indoor base station in response to said request for timing synchronization information.

Various embodiments are directed to apparatus, e.g., user devices such as a user equipment (UE) device, base stations (macro cell base stations and small cell base stations) such as a gNB or ng-eNB, network nodes, an AMF device, servers, customer premises equipment devices, cable systems, network nodes, gateways, cable headend/hubsites, network monitoring node/servers, cluster controllers, cloud nodes, production nodes, cloud services servers and/or network equipment devices. Various embodiments are also directed to methods, e.g., method of controlling and/or operating user devices, base stations, gateways, servers, cable networks, cloud networks, nodes, servers, cloud service servers, customer premises equipment devices, controllers, network monitoring nodes/servers and/or cable or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, message generation, signal generation, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., an indoor device such as a CBSD supporting NB-IoT, an outdoor device such as a cellular base station supporting NB-IoT, a NPT server, a HSS server, a UE device, an IoT application server, etc., said device including a processor configured to implement one, multiple or all of the steps of one or more methods of the invention.

In some embodiments, the processor or processors, e.g., CPUs, of one or more devices, e.g., communications nodes such as an indoor device such as a CBSD supporting NB-IoT, a cellular base station supporting NB-IoT, a NPT server, a HSS server, a UE device, an IoT application server are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., communications node such as a CBSD supporting NB-IoT, an outdoor device such as a cellular base station supporting NB-IoT, a NPT server, a HSS server, a UE device, an IoT application server, etc., includes a component corresponding to each of one or more of the steps of the various described methods performed by the device in which the processor is included. In some but not all embodiments a device, e.g., as a CBSD supporting NB-IoT, an outdoor device such as a cellular base station supporting NB-IoT, a NPT server, a HSS server, a UE device, an IoT application server, etc., includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above.

Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a CBSD supporting NB-IoT, an outdoor device such as a cellular base station supporting NB-IoT, a NPT server, a HSS server, a UE device, an IoT application server, or other device described in the present application. In some embodiments components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of communicating timing information, the method comprising:
   operating a first indoor device with a Narrowband Internet of Things (NB-IoT) receiver to receive a NB-IoT signal transmitted by a first outdoor base station and to recover timing information from said received NB-IoT signal; and
   operating the first indoor device to communicate timing information recovered from said received NB-IoT signal to a second indoor device.

2. The method of claim 1, wherein recovering timing information includes recovering a first packet of timing synchronization information, said first packet of timing synchronization information including an original reference time stamp indicating a time indicated by a reference timing source which provided timing information to said first outdoor base station.

3. The method of claim 2, wherein said first packet of timing synchronization information further includes a first stratum indicating the level of proximity to the reference timing source.

4. The method of claim 3, wherein said first packet of timing synchronization information further includes a first path loss delay offset and a synch counter; and
wherein said first packet of timing synchronization information further includes a reference time stamp indicating a reference time stamp value, frequency information indicating oscillator pulse frequency and phase information indicating oscillator pulse phase.

5. The method of claim 2, wherein operating the first indoor device to communicate timing information recovered from said NB-IoT signal to a second indoor device includes:
operating the first indoor device to generate a second packet of timing synchronization information from timing information recovered from said first packet of timing synchronization information; and
operating the first indoor device to transmit the second packet of timing synchronization information to the second indoor device.

6. The method of claim 5, wherein generating the second packet of timing synchronization information includes:
incrementing stratum information to reflect that the second packet of timing synchronization information is being transmitted by a device which is further away from said reference timing source than said first outdoor base station.

7. The method of claim 6, wherein generating the second packet of timing synchronization information further includes:
including a second path loss delay offset value in said second packet of timing synchronization information, said second path loss delay offset value being larger than a first path loss delay offset value included in said first packet of timing synchronization information.

8. The method of claim 7, wherein generating the second packet of timing synchronization information further includes:
including a reference time stamp generated by said first indoor device in said second packet of timing synchronization information and an original time stamp obtained from said first packet of timing synchronization information.

9. The method of claim 5, wherein transmitting the second packet of timing synchronization information to the second indoor device includes transmitting the second packet of timing synchronization information over a wired network interface to said second indoor device.

10. The method of claim 5, further comprising:
operating the first indoor device to send a synchronization request signal to the first outdoor base station via a wireless NB-IoT signal transmitted by the first indoor device; and
wherein said first packet of timing synchronization information is received from the first outdoor base station in response to said synchronization request signal.

11. The method of claim 10, further comprising:
storing in a network server or a database coupled to said network server information indicating indoor devices which are to receive timing synchronization signals via NB-IoT signals as part of a NB-IoT timing service; and
operating a network time protocol (NTP) server to provide timing information from said reference timing source to one or more outdoor base stations which provide service to one or more indoor devices which subscribe to a NB-IoT timing service, said one or more outdoor base stations including said first outdoor base station.

12. The method of claim 10, further comprising:
operating the first outdoor base station to receive timing information from said reference timing source;
operating the first outdoor base station to generate said first packet of timing synchronization information from timing information received from said reference timing source; and
operating the first outdoor base station to transmit said first packet of timing synchronization information to said first indoor base station in response to said synchronization request signal.

13. A communications system comprising:
a first indoor device including:
a first Narrowband Internet of Things (NB-IoT) receiver; and
a first processor; and wherein said first processor is configured to:
operate the first indoor device with the first NB-IoT receiver to receive a NB-IoT signal transmitted by a first outdoor base station and to recover timing information from said received NB-IoT signal; and
operate the first indoor device to communicate timing information recovered from said received NB-IoT signal to a second indoor device.

14. The communications system of claim 13, wherein said first processor is configured to:
operate the first indoor device to recover a first packet of timing synchronization information, as part of being configured to operate the first indoor device to recover timing information, said first packet of timing synchronization information including an original reference time stamp indicating a time indicated by a reference timing source which provided timing information to said first outdoor base station.

15. The communications system of claim 14, wherein said first processor is configured to:
generate a second packet of timing synchronization information from timing information recovered from said first packet of timing synchronization information; and
operate the first indoor device to transmit the second packet of timing synchronization information to the second indoor device,
as part of being configured to operate the first indoor device to communicate timing information recovered from said NB-IoT signal to a second indoor device.

16. The communications system of claim 15, wherein said first processor is configured to:
operate the first indoor device to transmit the second packet of timing synchronization information over a wired network interface to said second indoor device, as part of being configured to operate the first indoor device to transmit the second packet of timing synchronization information to the second indoor device.

17. The communications system of claim 15, wherein said first processor is further configured to:
  operate the first indoor device to send a synchronization request signal to the first outdoor base station via a wireless NB-IoT signal transmitted by the first indoor device; and
  wherein said first packet of timing synchronization information is received from the first outdoor base station in response to said synchronization request signal.

18. The communications system of claim 17, further comprising:
  a network server including a second processor; and
  wherein said second processor is configured to:
    operate the network server to: store in the network server information indicating indoor devices which are to receive timing synchronization signals via NB-IoT signals as part of a NB-IoT timing service or
    operate the network server to: retrieve from a database information indicating indoor devices which are to receive timing synchronization signals via NB-IoT signals as part of a NB-IoT timing service; and
  a network time protocol (NTP) server including a third processor; and
  wherein said third processor is configured to:
    operate the network time protocol (NTP) server to provide timing information from said reference timing source to one or more outdoor base stations which provide service to one or more indoor devices which subscribe to a NB-IoT timing service, said one or more outdoor base stations including said first outdoor base station.

19. The communications system of claim 17, further comprising:
  said first outdoor base station including a second processor; and
  wherein said second processor is configured to:
    operate the first outdoor base station to receive timing information from said reference timing source;
    generate said first packet of timing synchronization information from timing information received from said reference timing source; and
    operate the first outdoor base station to transmit said first packet of timing synchronization information to said first indoor base station in response to said synchronization request signal.

20. A non-transitory computer readable medium including computer executable instructions which when executed by a processor of a first indoor device cause the first indoor device to perform the steps of:
  operating the first indoor device to receive a Narrowband Internet of Things (NB-IoT) signal transmitted by a first outdoor base station and to recover timing information from said received NB-IoT signal; and
  operating the first indoor device to communicate timing information recovered from said received NB-IoT signal to a second indoor device.

* * * * *